(12) United States Patent
Dumbaugh

(10) Patent No.: US 6,948,611 B2
(45) Date of Patent: Sep. 27, 2005

(54) VIBRATORY CONVEYING APPARATUS ADAPTED TO BE DRIVEN BY ACCUMULATIVELY PHASED ROTATING ECCENTRIC WEIGHTS

(75) Inventor: George D. Dumbaugh, Louisville, KY (US)

(73) Assignee: Kinergy Corporation, Louisville, KY (US)

( * ) Notice: Subject to any disclaimer, the term of this patent is extended or adjusted under 35 U.S.C. 154(b) by 29 days.

(21) Appl. No.: 10/928,230

(22) Filed: Aug. 27, 2004

(65) Prior Publication Data

US 2005/0023111 A1 Feb. 3, 2005

Related U.S. Application Data

(63) Continuation-in-part of application No. 09/625,421, filed on Jul. 25, 2000, now Pat. No. 6,851,548.
(60) Provisional application No. 60/146,462, filed on Jul. 30, 1999.

(51) Int. Cl.[7] .............................................. B65G 22/02
(52) U.S. Cl. ......................... 198/756; 198/770; 198/766
(58) Field of Search ............................... 198/756, 752.1, 198/763, 766, 770, 771

(56) References Cited

U.S. PATENT DOCUMENTS

| | | | |
|---|---|---|---|
| 2,830,696 A | | 4/1958 | Musschoot |
| 2,853,180 A | * | 9/1958 | White .......................... 198/756 |
| 2,946,429 A | * | 7/1960 | Carrier, Jr. ................... 198/756 |
| 3,053,379 A | | 9/1962 | Roder et al. |
| 3,149,759 A | * | 9/1964 | Manley ........................ 198/756 |
| 3,178,068 A | | 4/1965 | Dumbaugh |
| 3,251,457 A | | 5/1966 | Dumbaugh |
| 3,254,879 A | | 6/1966 | Carrier, Jr. |
| 3,407,670 A | | 10/1968 | Venadzetti |
| 3,659,465 A | | 5/1972 | Oshima et al. |
| 3,744,676 A | | 7/1973 | Dumbaugh |
| 3,789,977 A | * | 2/1974 | Musschoot ................... 198/756 |
| 4,015,705 A | | 4/1977 | Dumbaugh |
| 4,149,627 A | | 4/1979 | Dumbaugh et al. |
| 4,180,458 A | | 12/1979 | Shahan |
| 4,255,254 A | | 3/1981 | Faust et al. |
| 4,267,919 A | * | 5/1981 | Schrader ...................... 198/756 |
| 4,768,647 A | * | 9/1988 | Lehtola ........................ 198/760 |
| 4,775,284 A | * | 10/1988 | Musschoot ................... 198/756 |
| 4,826,017 A | | 5/1989 | Du Bourg et al. |
| 4,979,608 A | | 12/1990 | Mikata et al. |
| 5,392,898 A | | 2/1995 | Burgess et al. |
| 5,477,958 A | * | 12/1995 | Buhren et al. ............... 198/751 |
| 5,615,763 A | | 4/1997 | Schieber |
| 6,024,210 A | | 2/2000 | Rosenstrom |
| 6,827,201 B1 | * | 12/2004 | Markowski et al. ......... 198/753 |

FOREIGN PATENT DOCUMENTS

WO    WO 99/28218    6/1999

* cited by examiner

Primary Examiner—James R. Bidwell
(74) Attorney, Agent, or Firm—Barnes & Thornburg LLP

(57) ABSTRACT

A circular vibratory conveying apparatus for conveying material. The apparatus includes a bed on which material is conveyed, a counterbalance supported on a plurality of isolation springs, a plurality of inclined drive springs extending between the bed and the counterbalance, and a plurality of stabilizers for controlling movement of the drive springs along their central axes. Three or more vibratory motors, each having rotatable eccentric weights, are attached to the counterbalance. The eccentric weights rotate in phase with one another to rotationally vibrate the bed at a vibration frequency.

25 Claims, 17 Drawing Sheets

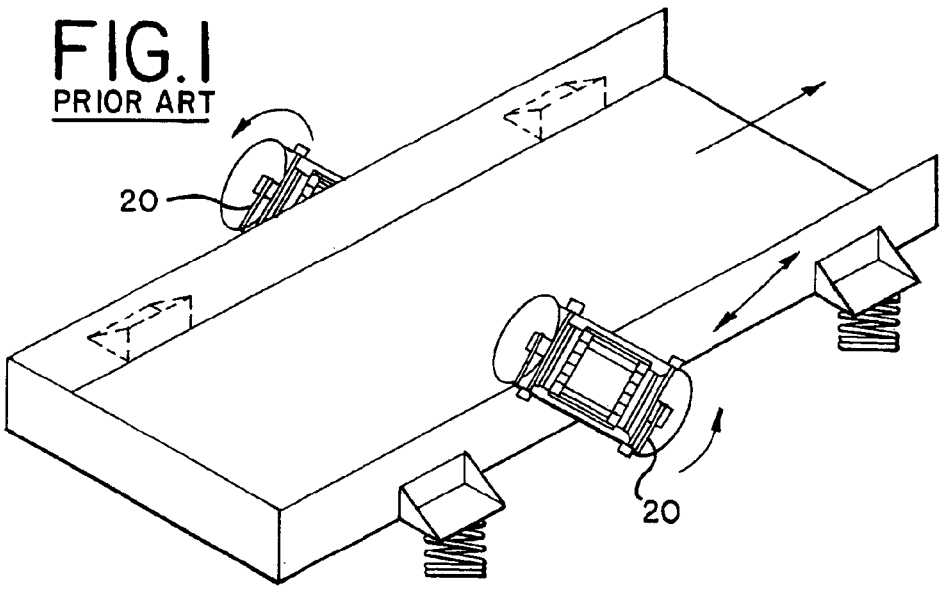
FIG.1 PRIOR ART
FIG.2A OPPOSITE ROTATION
FIG.2B SAME ROTATION
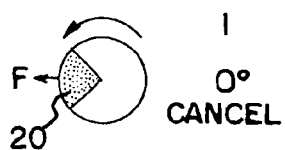 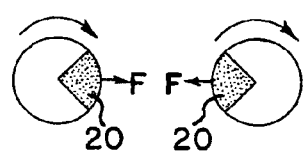 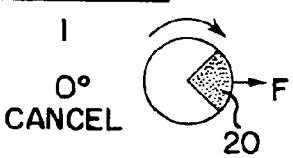
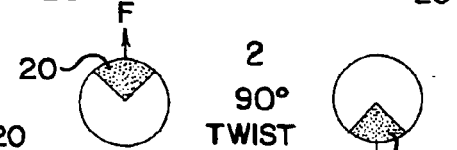
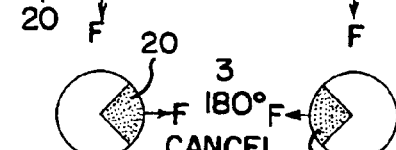 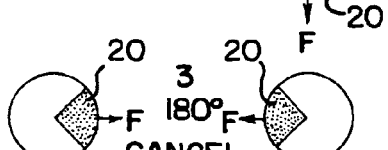
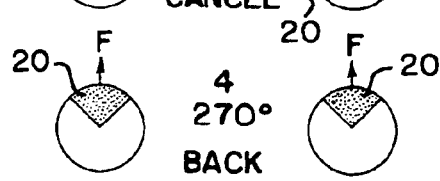 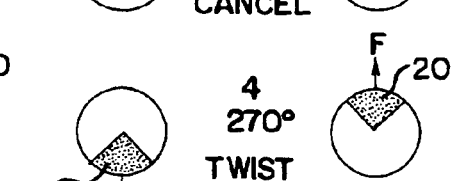
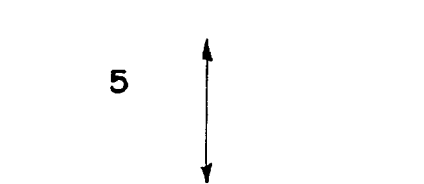 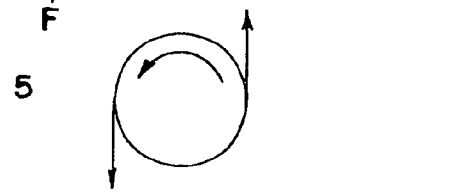
RESULTING LINEAR STROKE    RESULTING TWIST TYPE STROKE

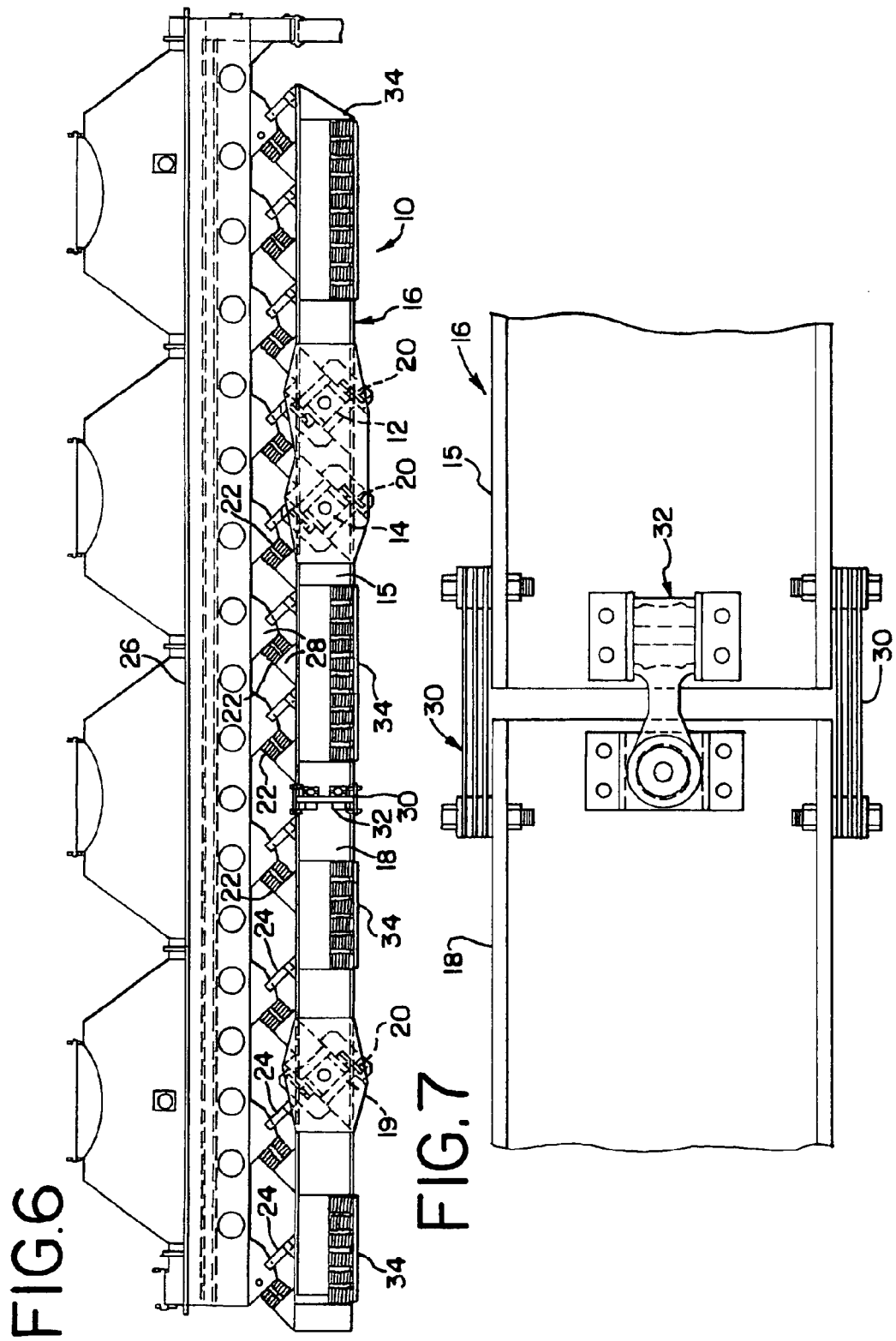

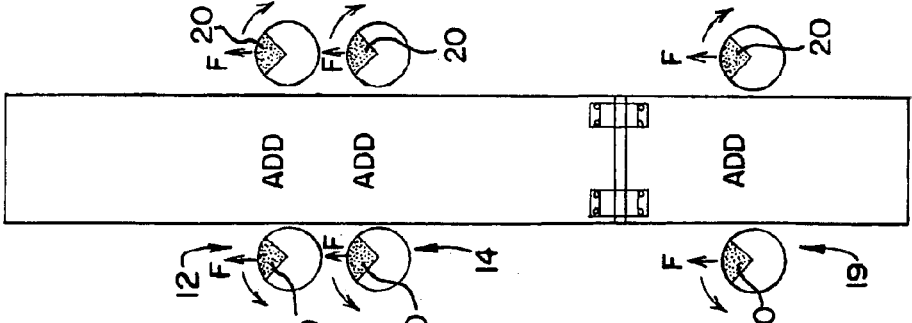

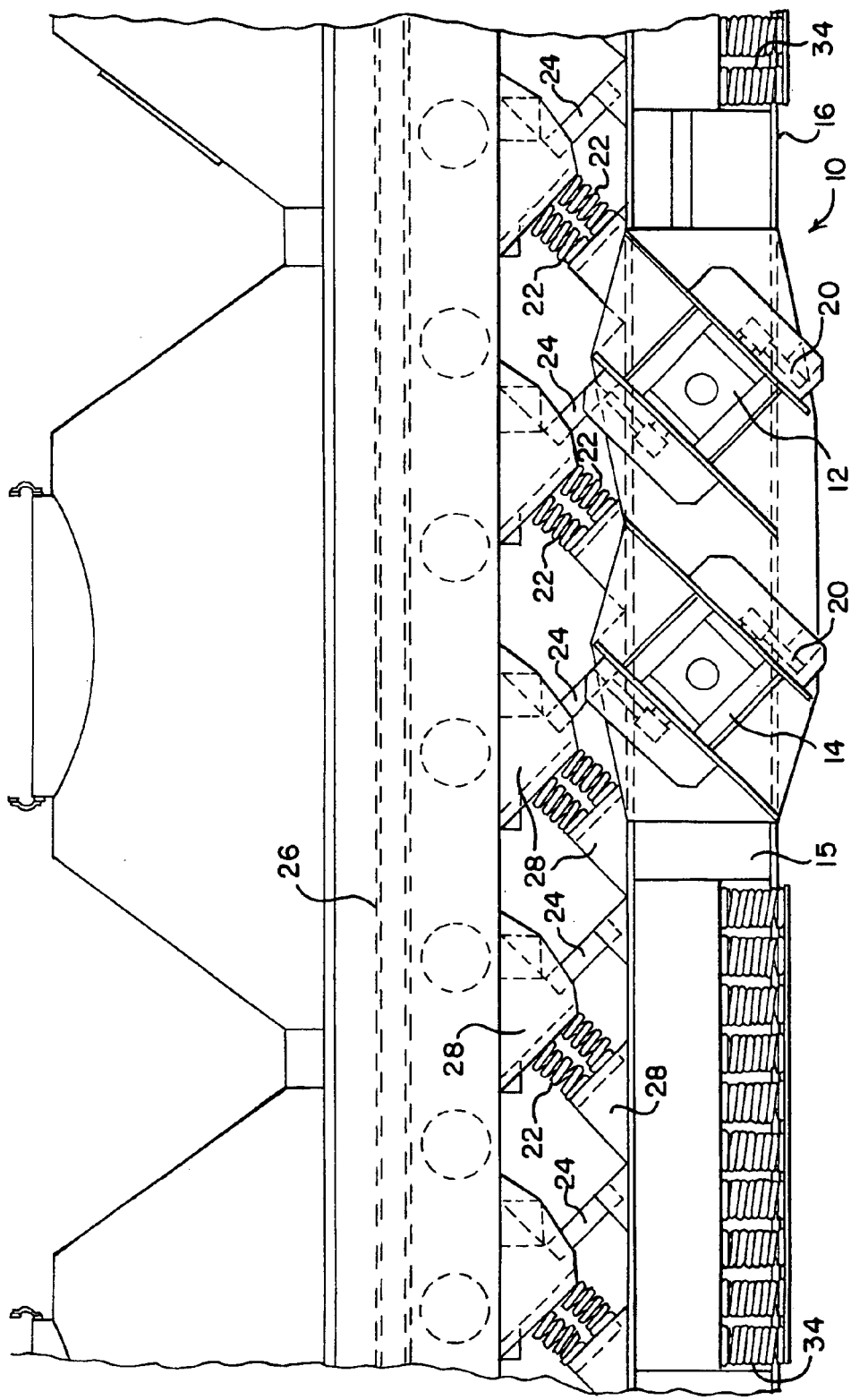

CANCEL

CANCEL

TWIST

TWIST

VIBRATORY CONVEYING APPARATUS ADAPTED TO BE DRIVEN BY ACCUMULATIVELY PHASED ROTATING ECCENTRIC WEIGHTS

RELATED APPLICATIONS

This application is a continuation-in-part of U.S. application Ser. No. 09/625,421, filed Jul. 25, 2000, now U.S. Pat. No. 6,851,548, which claims the benefit of U.S. Provisional Application No. 60/146,462, filed Jul. 30, 1999.

BACKGROUND OF THE INVENTION

The present invention is directed to a linear vibratory conveying apparatus that is adapted to be driven by a plurality of pairs of rotatable eccentric weights, and a circular vibratory conveying apparatus that is adapted to be driven by three or more rotatable eccentric weights, wherein the vibratory conveying apparatus includes sub-resonant tuned drive springs and the rotatable weights are accumulatively phased during rotation.

In the vibratory industry, vibratory conveying apparatus such as vibrating feeders, vibrating conveyors, vibrating screens, vibrating heat transferring fluidized beds, attrition mills, and the like, were all powered by a well-known and popular driving method called the "Single Input" or "Brute Force" type of drive. A single pair of rotating eccentric weights is the sole source of the input power in this kind of drive. Being installed directly across from one another, a single pair of eccentric weights rotating in opposite directions, as shown in FIG. 1, would vibrate the vibratory conveying apparatus with a linear or "back and forth", straight line motion. As the load carrying capability of the conveying apparatus increased over the years, the weight of the rotating eccentric weights also necessarily increased in size. So did the horsepower demand of the electric motor utilized to rotate the eccentric weights. Examples of this practical situation are seen in U.S. Pat. No. 4,180,458 and U.S. Pat. No. 4,826,017. In both of those patents, only one pair of rotating eccentric weights is utilized. U.S. Pat. No. 4,180,458 utilizes a "vee-belt" type of connection between the jack shaft which is rotating the eccentric weights and the driving motor. In U.S. Pat. No. 4,826,017, vibratory motors could be utilized, or eccentric weights mounted on a jack shaft that are rotated by a vee-belt or chain type of motor drive could be utilized.

To achieve a circular conveying motion, a pair of rotating eccentric weights are mounted diametrically opposite to one another. Then, by rotating the eccentric weights in the same direction, a "twist" type of vibratory action or circular conveying could be achieved. An example is U.S. Pat. No. 3,254,879. As shown therein two electric motors are directly coupled to eccentric weights mounted on a jack shaft. The result is a helical stroke that conveys the contained material in a circular direction. Another example of this situation is illustrated in Dumbaugh U.S. Pat. No. 3,178,068 and in FIGS. 5A and 5B.

For many years, it has been well known that a single pair of rotating eccentric weights can be combined for use with a vibratory conveying apparatus to produce either a "linear" or "twist" kind of stroke action. By mentally "stopping" and picturing the position of the eccentric weights 20 in four 90° increments of one 360° rotation, one complete revolution is diagramed in each of FIGS. 2A and 2B. When both of the eccentric weights 20 rotate in opposite directions relative to one another as diagramed in FIG. 2A, a "linear" type of stroke output is achieved. By making the pair of rotating eccentric weights 20 rotate in the same direction relative to one another, as depicted in FIG. 2B, the stroke output develops a "twist" from the resulting force-couple.

A pair of rotating eccentric weights will properly "phase" to produce either a "linear" or "twist" kind of vibratory force and resulting stroke output because they inherently seek their lowest level of energy output. Said differently, the vibratory motors which rotate the eccentric weights try to do as little work as possible. Consequently, the eccentric weights "balance" or cancel the force output for two-quarter portions of the rotational cycle at 0° and 180°. In so doing, the two eccentric weights are necessarily prompted to combine their force outputs for the remaining two-quarter portions, or the other half, of their rotational cycle at 90° and 270°. When that happens, the two motors involved accumulatively add their power capability. For example, if two 1.5 horsepower (HP) motors are used, the total power capability of the pair of motors would be 3 HP.

The pair of rotatable eccentric weights can be mounted on a jackshaft with two bearings and driven by a motor through an appropriate "vee" belt combination. Two jackshafts, one for each eccentric weight, would be required. Any other type of suitable transmission such as a chain, gears, or the like could also be used. Another alternative is to utilize a vibratory motor 11 as provided by Kinergy Corporation, as shown in FIG. 3. Such a vibratory motor has a double extended shaft. Eccentric weights 20 can be installed on both ends of the shaft, but are cumulatively considered as a single rotatable eccentric weight. Vibratory motors equipped with shaft mounted eccentric weights will be emphasized herein, but other jackshaft driven combinations can also be used such as vee-belts and the like. In either instance, the pair of rotatable eccentric weights are installed on and become an integral part of the conveying trough assembly.

When more input power is needed to move heavier loads along the length of the conveying trough, more rotating eccentric weight force and horsepower are needed. Consequently, the rotatable eccentric weights become larger and heavier and have a greater force output. Likewise, the electrical windings in the vibratory motor increase in size to produce more horsepower. This increase in eccentric weight force output and the respective vibratory motor horsepower has approached the point that the vibratory motors are presently as large as practical to manufacture or to utilize on a vibratory conveying type of apparatus. Therefore, if some method of combining a plurality of pairs of vibratory motors and rotatable eccentric weights could be found, it would enable two or more pairs of vibratory motors and eccentric weights to be used in combination instead of only one pair of motors that are essentially two times as large or more.

Over the years, many attempts have been made to combine more than one pair of vibratory motors and eccentric weights to increase the total force output and the horsepower capability. Unfortunately, when more than one pair of rotating eccentric weights were utilized, they would always tend to "cancel" their respective force outputs. The resulting stroke action on the vibratory machine would actually become less or might even be reduced to virtually no displacement or zero stroke. An example of this unwanted situation is illustrated in FIG. 4. In FIG. 4, a second pair of rotating eccentric weights is being utilized. After the rotating eccentric weights are started up and are turning at their appropriate speed, each of the four eccentric weights will move to a place in its rotation so that all the output forces cancel one another. Consequently, the net force output is essentially zero and the motors involved are developing virtually no horsepower. This also happens when the motors are changed to rotate in opposite directions. Instead of adding their respective force outputs from each pair of eccentric weights, they cancel one another. This is the reason any combination of free-wheeling eccentric weights utilized on a vibratory conveying apparatus has always previously been limited to one pair.

The desired accumulative phasing of a plurality of pairs of rotating eccentric weights has never been successfully achieved with free-wheeling rotating eccentric weights that are not physically or mechanically rotationally linked or coupled to one another. Therefore, for many years, there has been an unanswered need for the ability to use more than one pair of rotating eccentric weights to enable the total vibratory force output capability to be increased and the related total amount of horsepower increased.

SUMMARY OF THE INVENTION

A linear or unidirectional vibratory conveying apparatus adapted to be driven by a plurality of accumulatively phased pairs of free-wheeling rotatable eccentric weights, and a circular vibratory conveying apparatus adapted to be driven by three or more free-wheeling rotatable eccentric weights. The accumulative force output produced by the rotating eccentric weights will be a unified amount equal to the sum of all of the eccentric weights. The respective power outputs of the motors turning these eccentric weights will also accumulatively add. This wanted "phasing" of multiple pairs of rotating eccentric weights, or of three or more rotating eccentric weights, will only occur when used in conjunction with properly stabilized, sub-resonant tuned, stiff drive springs. This kind of vibratory drive is sometimes called a "Free Mass" system but is more commonly known as the "Kinergy Drive System". Technically, it is identified as the "Electrically Controlled, Motorized Version of a 'Free Force Input' Combined with Sub-Resonant Tuned Springs" type of vibratory drive as disclosed in Dumbaugh U.S. Pat. No. 3,251,457.

The accumulative phasing of a plurality of pairs of rotating eccentric weights, and of three or more rotating eccentric weights, is applicable to vibratory conveyors of the non-balanced type, which must be rigidly fixed to their support structure. It is also applicable to vibratory conveying machines that are dynamically counterbalanced and provided with isolation springs. The counterbalance can be one single longitudinal assembly, or the counterbalance can be sectionalized in a plurality of sections as shown in Dumbaugh U.S. Pat. No. 4,149,627. The present invention is applicable to all types of induced linear conveying apparatus and machines, for example, vibrating feeders, vibrating conveyors, vibrating screens, vibrating fluidized bed coolers or dryers, foundry shakeouts, sand reclaimers, attrition mills, and the like. The invention can also be applied to circular conveying machines, as shown in FIGS. 14A–B, such as vibrating feeders, conveyors, spiral elevators, fluidized bed coolers or dryers, attrition mills, and the like. It is important to note all of these vibratory conveying machines must employ the sub-resonant tuned springs kind of vibratory drive configuration that is properly stabilized for this wanted multiple phasing of rotatable eccentric weights to occur.

The rotatable eccentric weights are installed on and become an integral part of the conveying trough assembly of the conveying apparatus when the vibratory conveying apparatus is the "non-balanced" type. This means its base frame is rigidly "fixed" to a robust stationary foundation. Conversely, when the vibratory conveyor is "dynamically counterbalanced", the rotatable eccentric weights can be installed on either the conveying trough or on a counterbalancing member. When the conveying apparatus is counterbalanced, the rotatable eccentric weights are almost always installed on the counterbalancing member.

BRIEF DESCRIPTION OF THE DRAWING FIGURES

FIG. 1 is a sketch of a vibratory conveyor driven by a single pair of vibratory motors with virtually equally sized rotating eccentric weights on each motor.

FIG. 2A is a diagram illustrating the resulting stroke output from a pair of rotating eccentric weights rotating in opposite directions relative to one another.

FIG. 2B is a diagram illustrating the resulting stroke output from a pair of rotating eccentric weights that are rotating in the same direction relative to one another.

FIG. 6 is a side elevational view of a vibratory conveying apparatus having three pairs of vibratory motors and rotatable eccentric weights and sub-resonant tuned steel coil type drive springs, and stabilizers.

FIG. 7 is a side elevational view of the connection between two sections of a counterbalance.

FIGS. 8A–D are diagrams showing the accumulative phasing of the three pairs of rotating eccentric weights of the conveying apparatus shown in FIG. 6.

FIG. 9A shows an enlarged portion of the conveying apparatus of FIG. 6.

Figure 3:
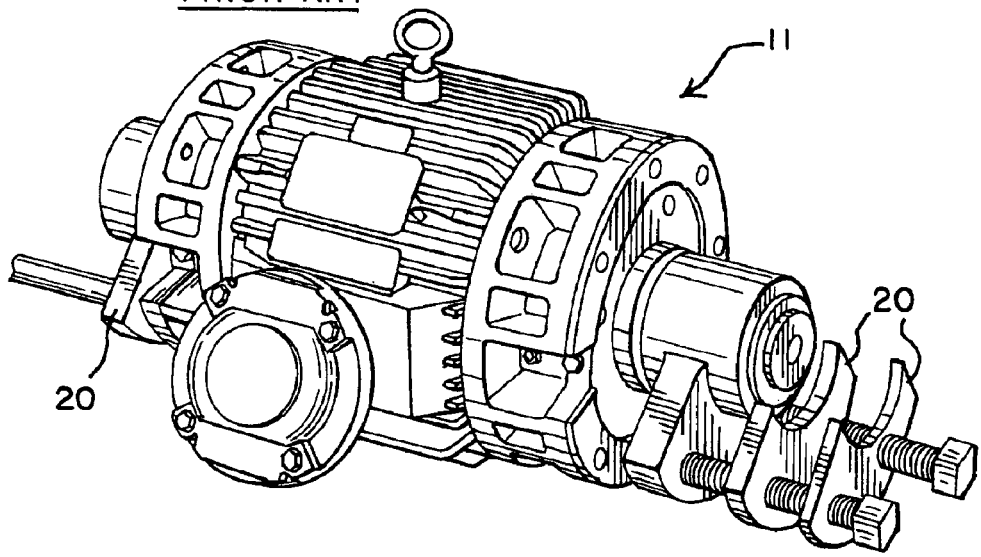
FIG. 3 shows a vibratory motor with rotatable eccentric weights.
Figure 4:
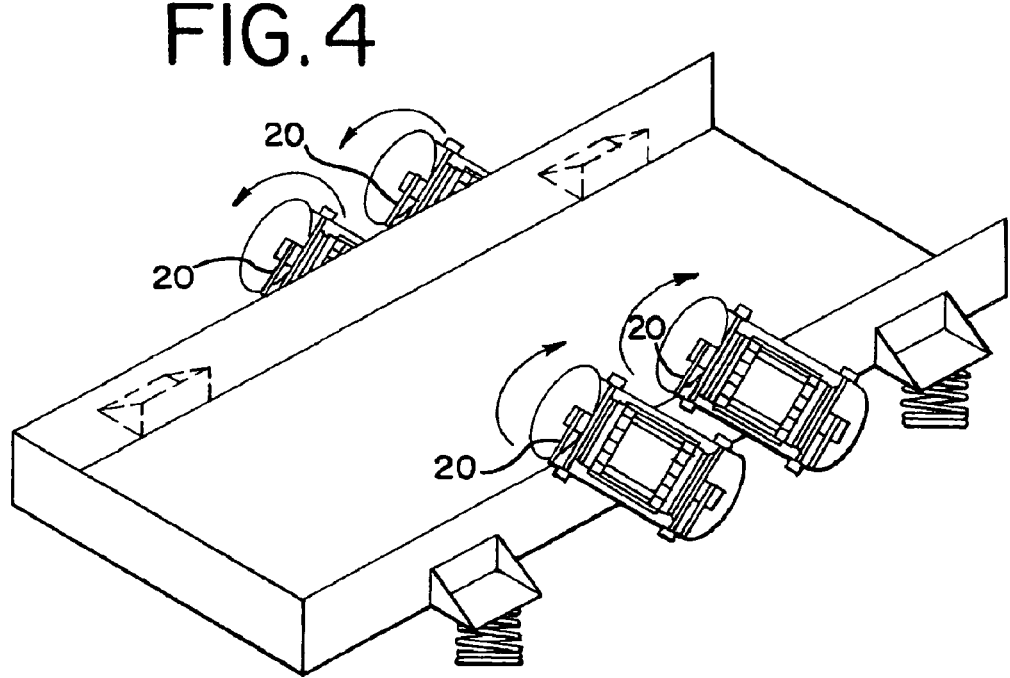
FIG. 4 is a sketch of a vibratory conveyor having two pairs of rotating eccentric weights attached to a conveyor apparatus, but without sub-resonant tuned drive springs.
Figure 5A:
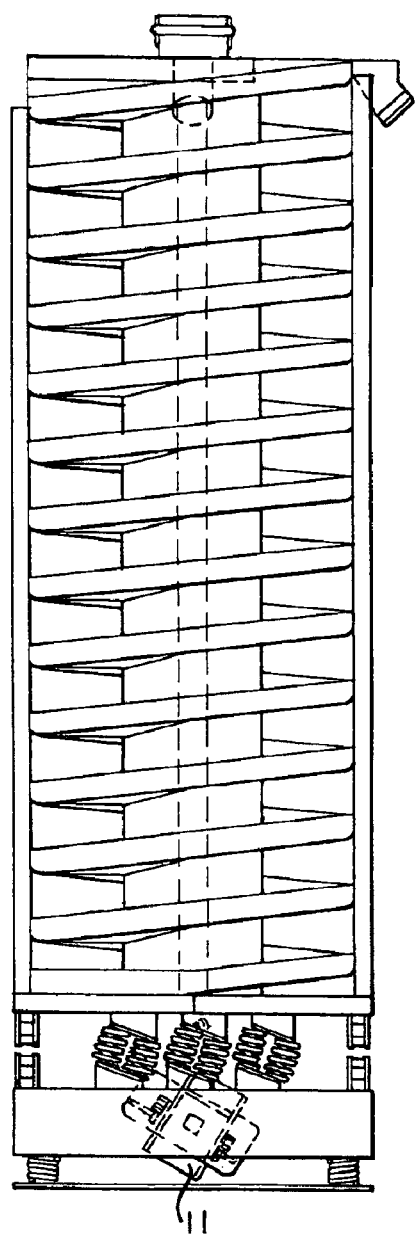
FIGS. 5A and 5B are sketches of a vibratory circular conveying mechanism having a single pair of vibratory motors and rotating eccentric weights.
Figure 5B:
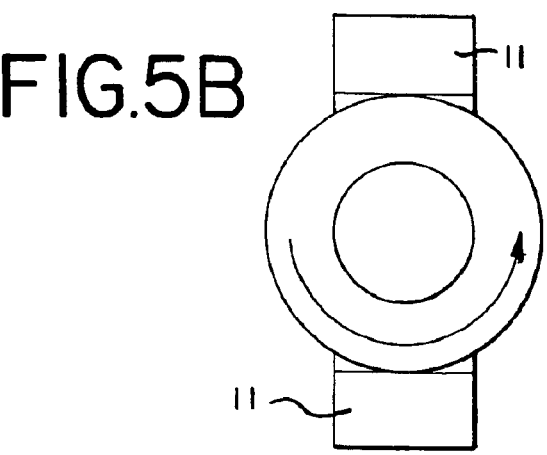
Figure 9B:
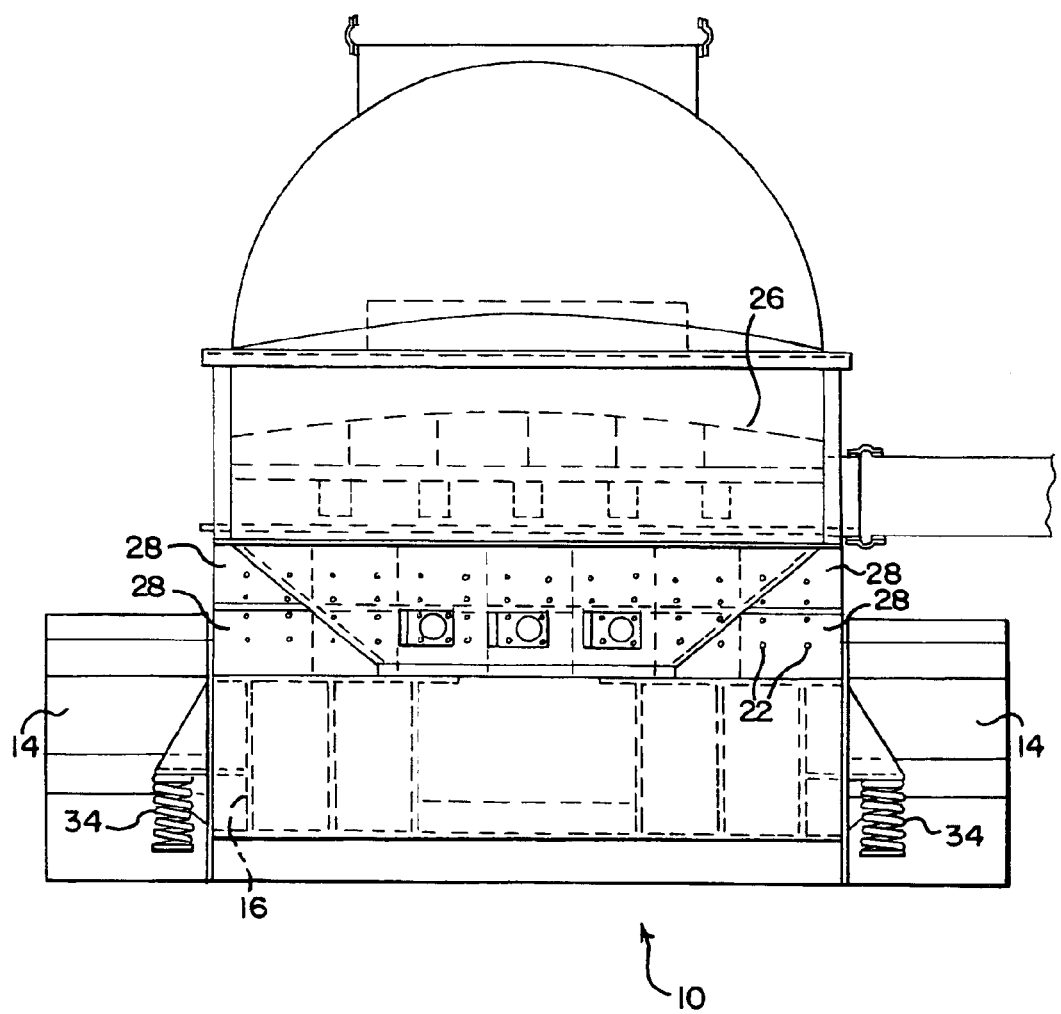

FIG. 9B is a cross section of the conveying apparatus of FIG. 6.

Figure 10:
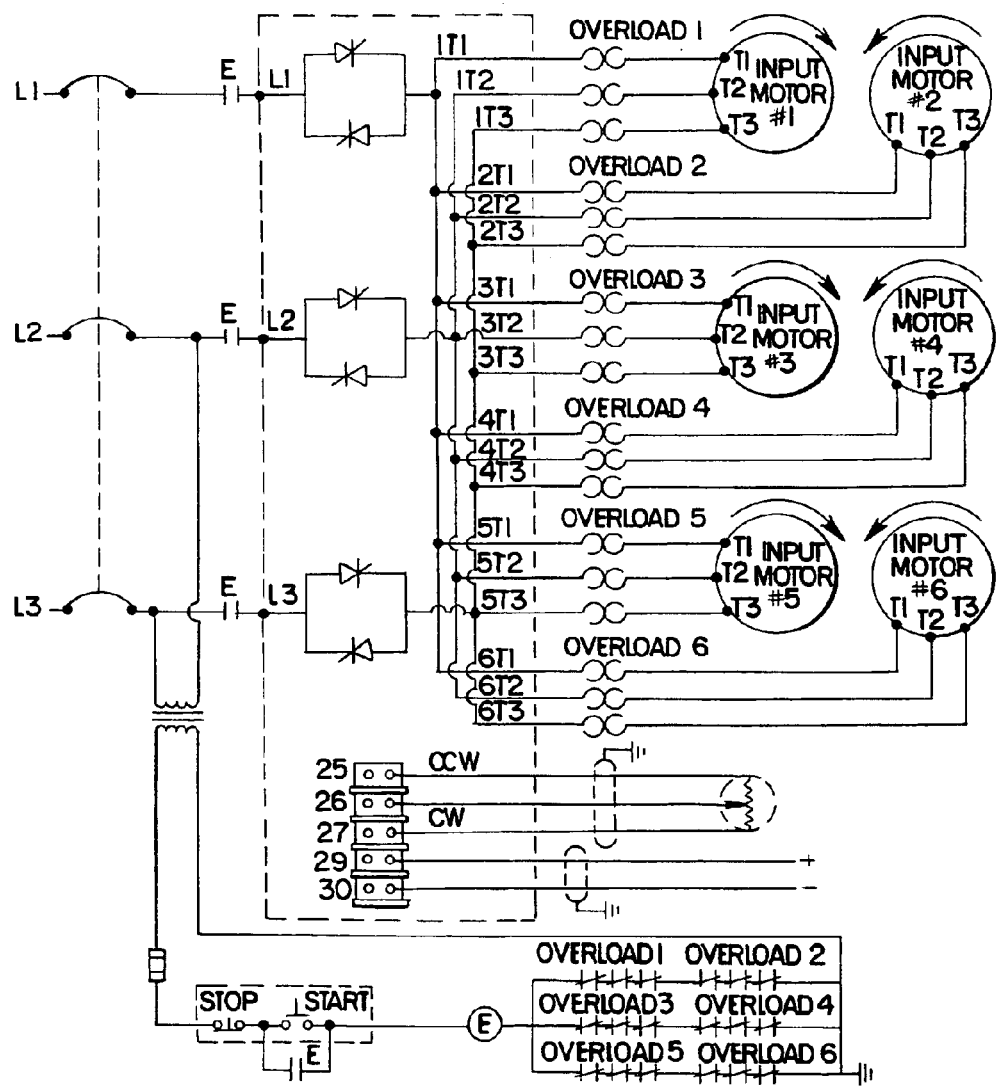

FIG. 10 is an electrical schematic for the vibratory motors of the conveying apparatus of FIG. 6.

Figure 11:
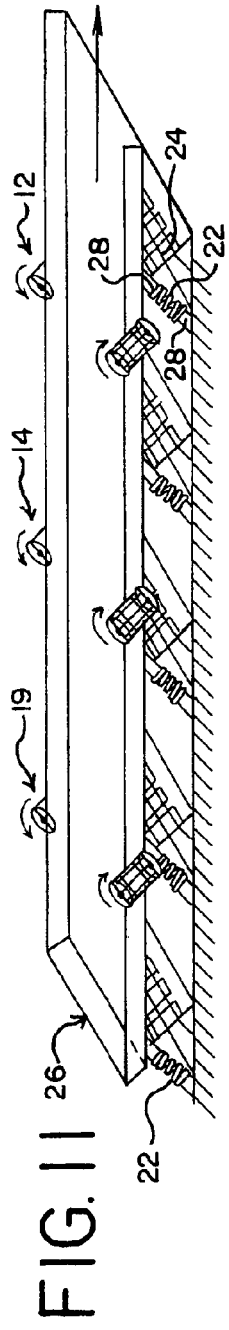

FIG. 11 is a side elevational view of a non-counterbalanced vibratory conveying apparatus including a plurality of pairs of vibratory motors and eccentric weights.

Figure 12:
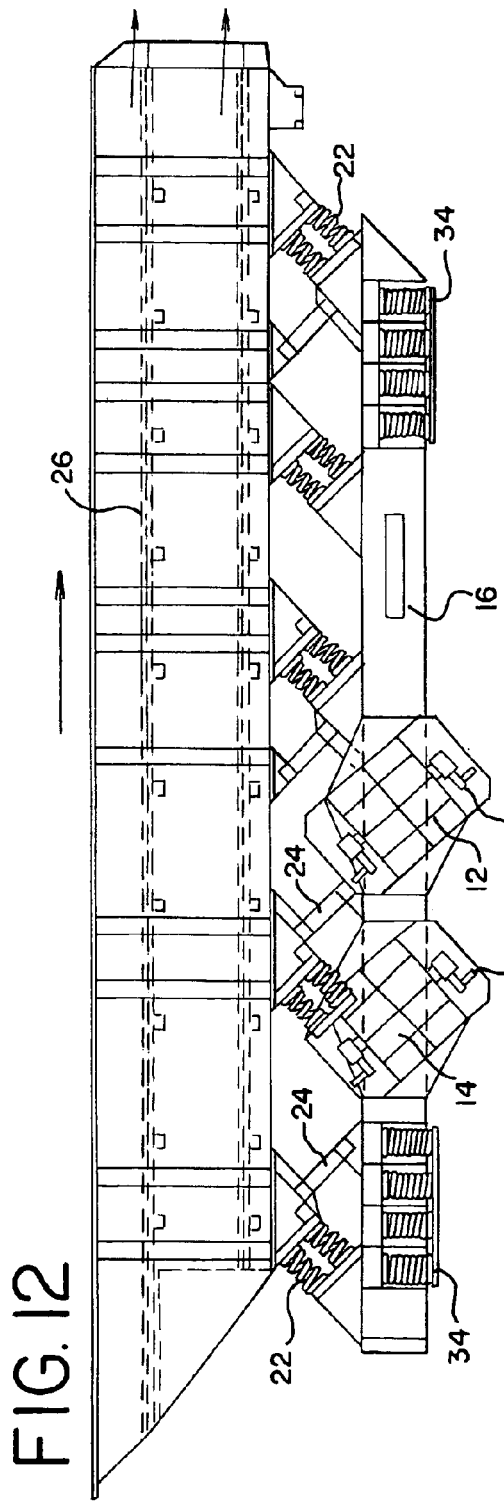

FIG. 12 is a side elevational view of a counterbalanced vibratory conveying apparatus having a one-piece counterbalance and a plurality of pairs of vibratory motors and rotatable eccentric weights.

Figure 13:
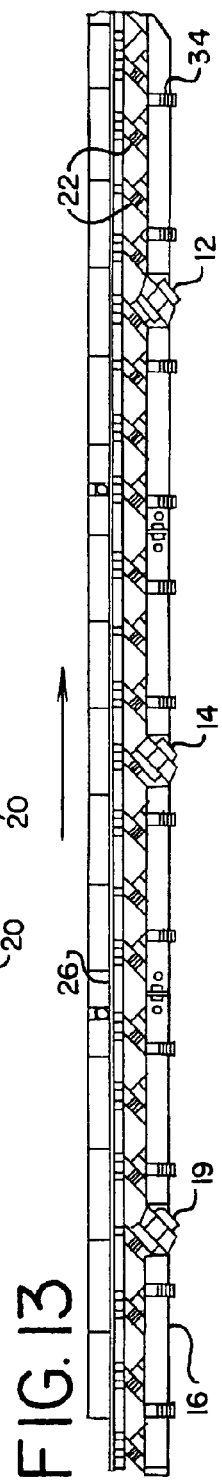

FIG. 13 is a side elevational view of a vibratory conveying apparatus including a sectionalized counterbalance and three pairs of vibratory motors and rotatable eccentric weights.

Figure 14A:
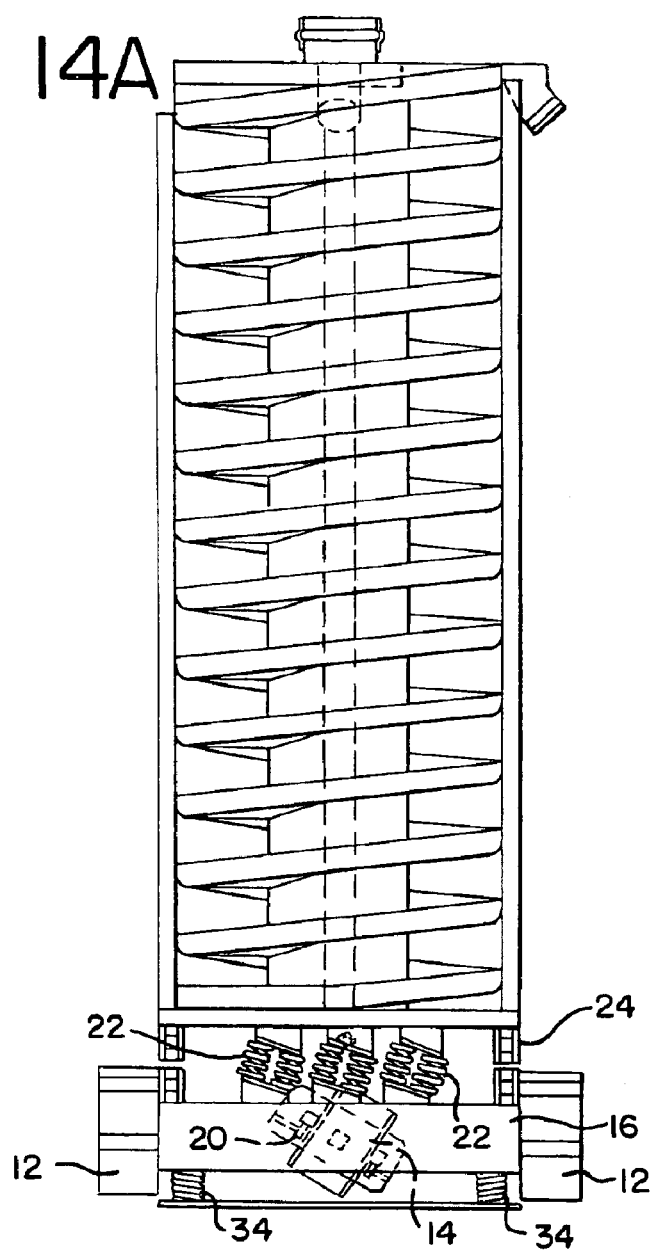
Figure 14B:
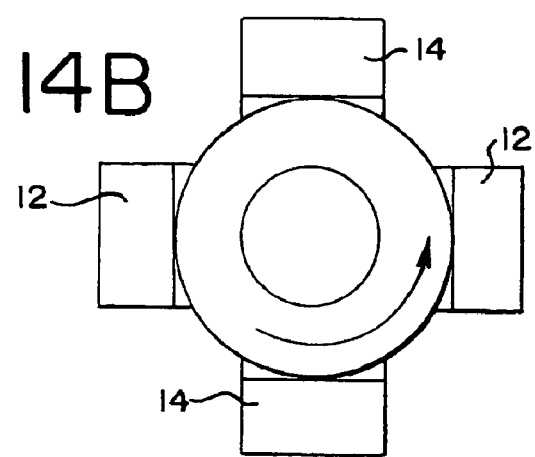

FIGS. 14A and 14B are sketches of a circular vibratory conveying apparatus including a plurality of pairs of vibratory motors and rotating eccentric weights.

FIGS. 15A–D are diagrams that show the accumulative phasing of the eccentric weights of the circular conveyor of FIGS. 14A–B.

Figure 15A:
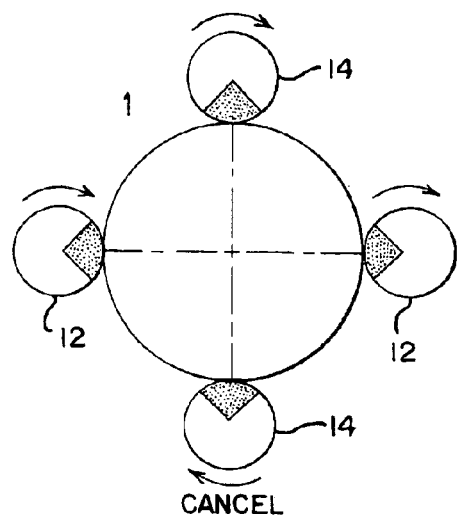
Figure 15C:
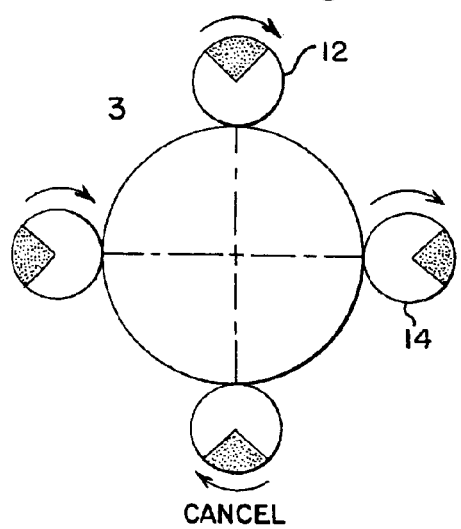
Figure 15B:
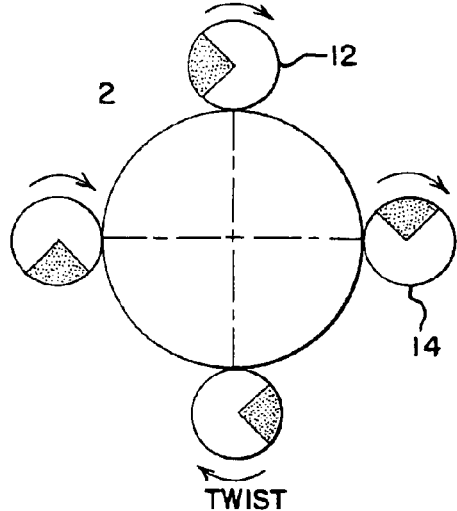
Figure 15D:
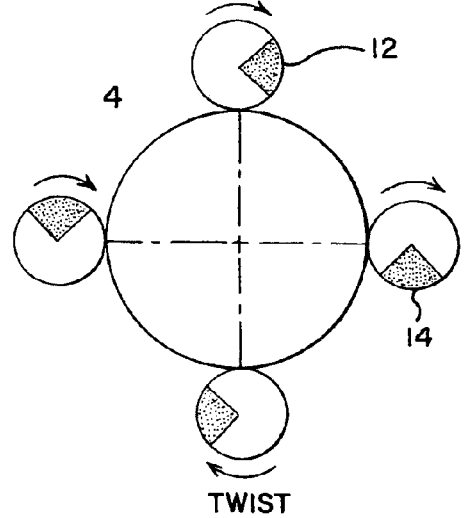
Figure 15E:
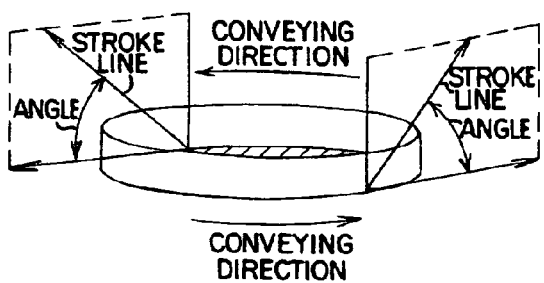
Figure 16A:
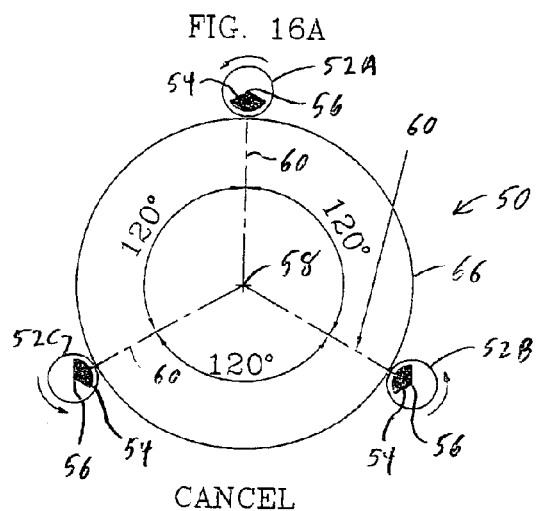
Figure 16C:
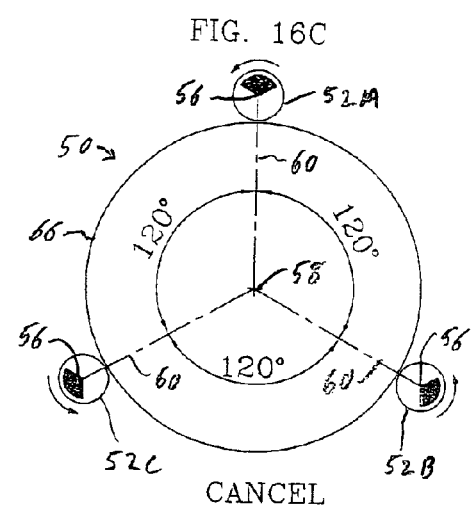
Figure 16B:
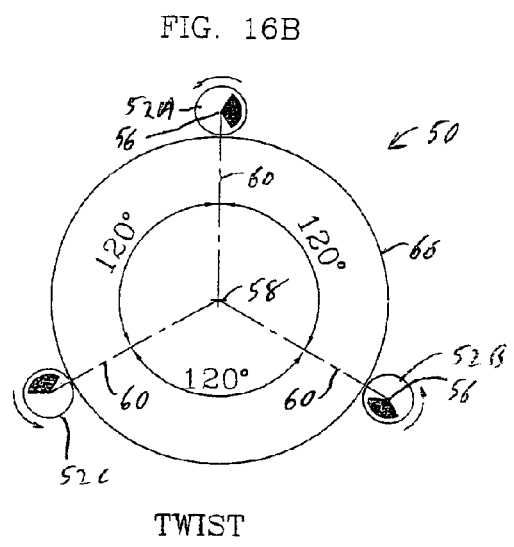
Figure 16D:
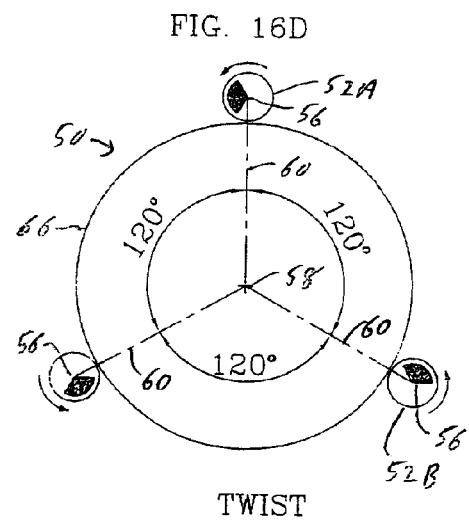

FIG. 15E is a diagram that shows the resulting stroke line of the rotating eccentric weights of FIGS. 15A–D and FIGS. 16A–D.

FIGS. 16A–D are diagrams that show the accumulative phasing of three rotatable eccentric weights of a circular vibratory conveying apparatus.

Figure 17:
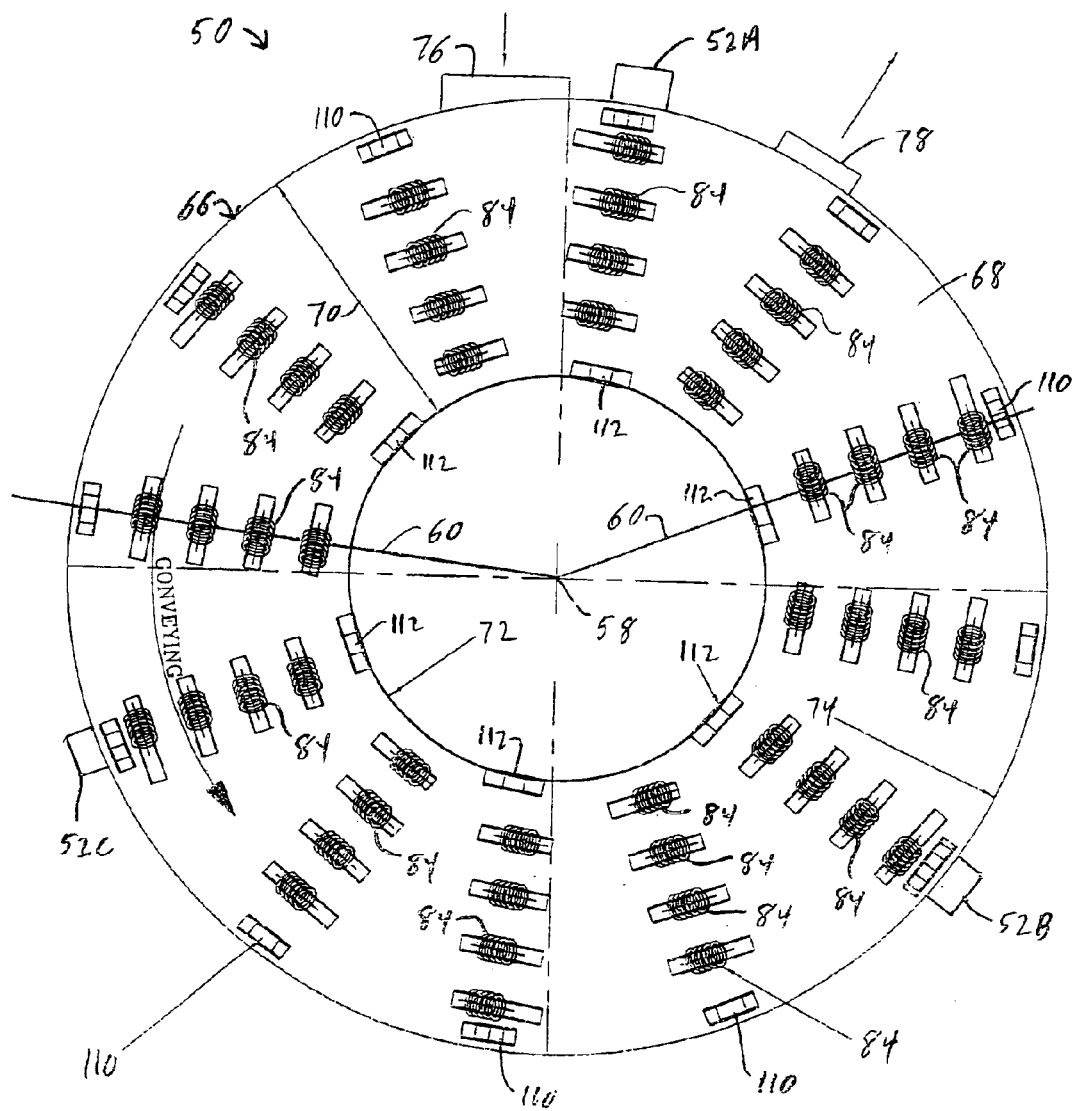

FIG. 17 is a diagrammatic plan view of a circular vibratory conveying apparatus that has a relatively large inside diameter.

Figure 18:
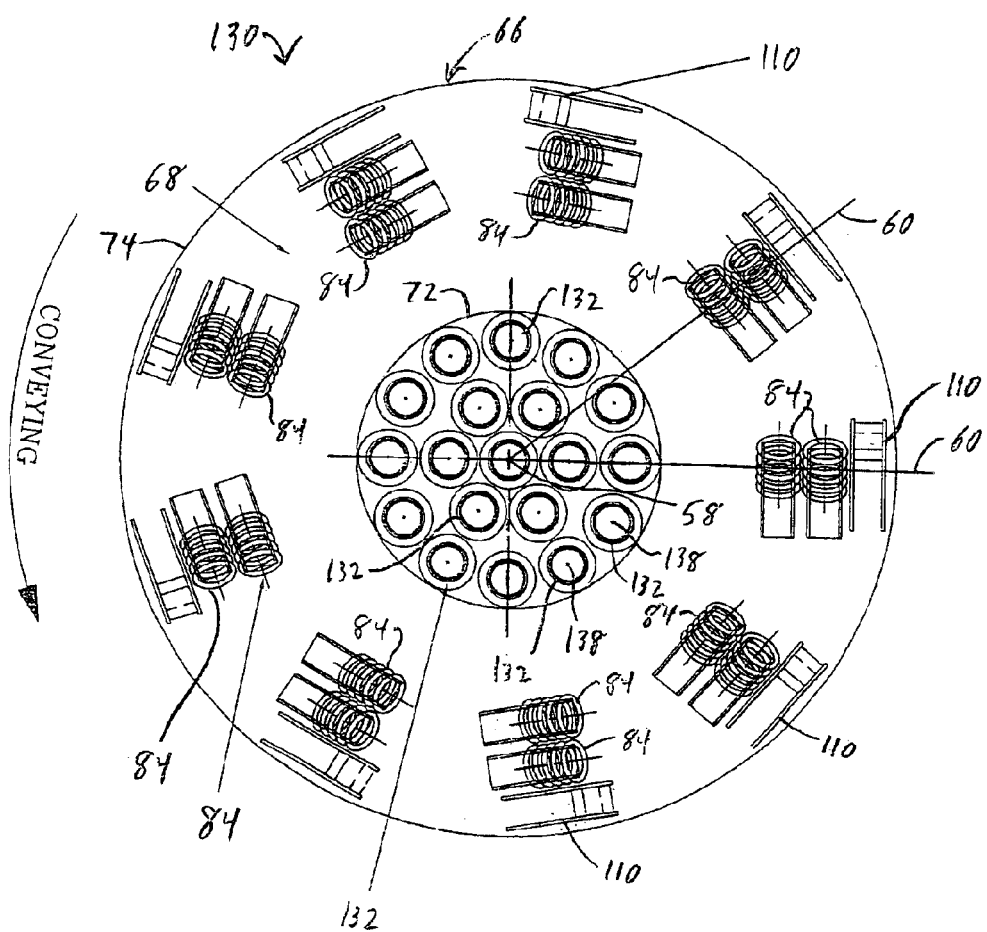

FIG. 18 is a diagrammatic plan view of a circular vibratory conveying apparatus including a plurality of inclined peripheral drive springs and one or more generally vertical central drive springs.

Figure 19:
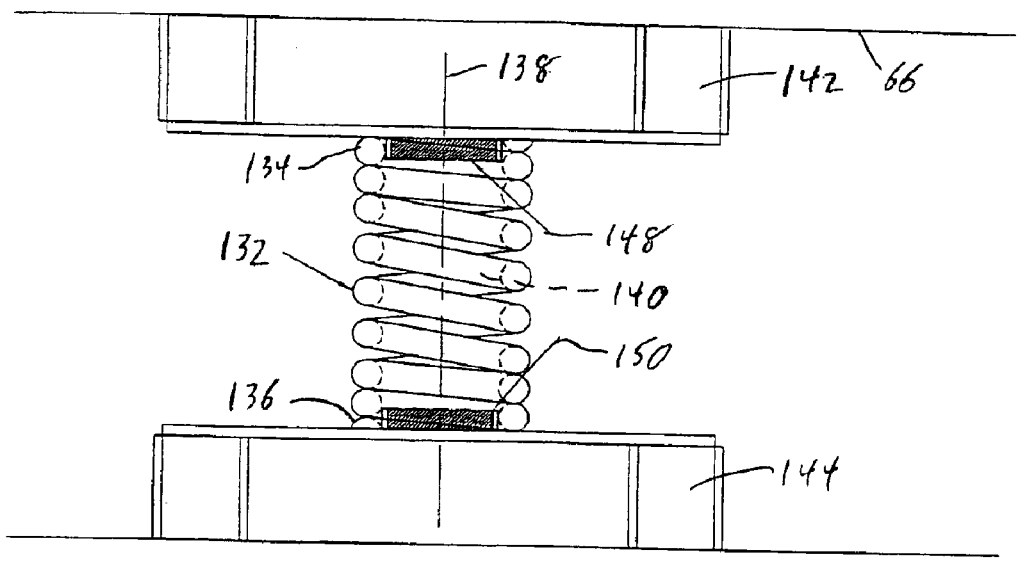

FIG. 19 is a side elevational view of a vertical central drive spring.

Figure 20:
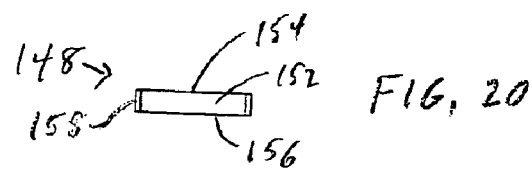

FIG. 20 is a side elevational view of a mounting member for a vertical central drive spring.

Figure 21:
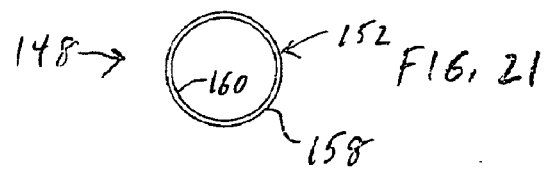

FIG. 21 is a top plan view of the circular mounting member of FIG. 20.

Figure 22:
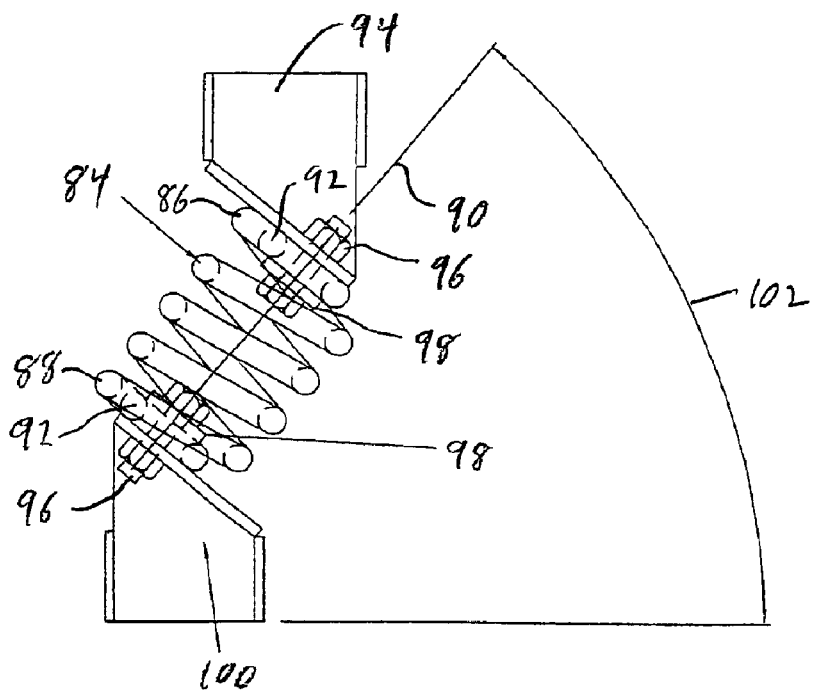

FIG. 22 is a side elevational view of an inclined peripheral drive spring.

Figure 23:
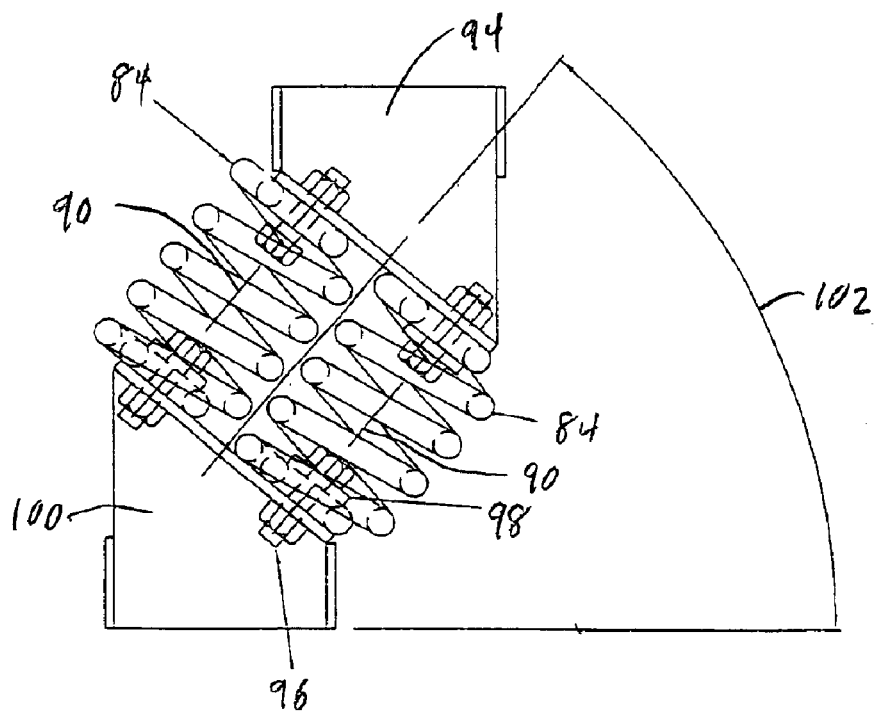

FIG. 23 is a side elevational view of dual inclined peripheral drive springs.

Figure 24:
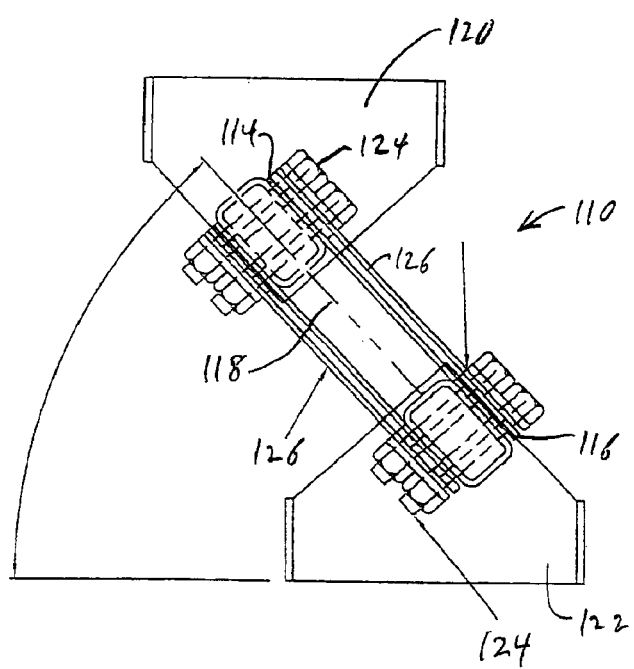

FIG. 24 is a side elevational view of a stabilizer.

Figure 25:
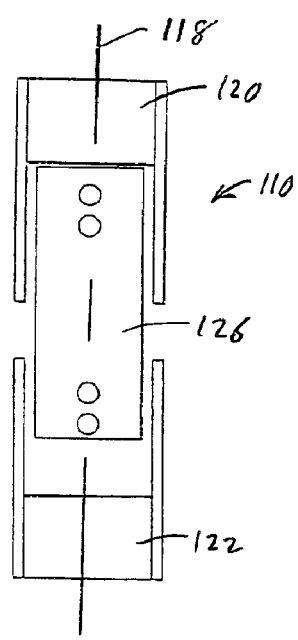

FIG. 25 is a front elevational view of the stabilizer of FIG. 24.

DETAILED DESCRIPTION OF THE PREFERRED EMBODIMENTS

A vibratory conveying apparatus 10 of the present invention, such as a sand cooler, is shown in FIG. 6. The vibratory conveying apparatus 10 utilizes the electrically controlled drive method as disclosed in Dumbaugh U.S. Pat. No. 3,251,457, which is incorporated herein by reference, and a sectionalized or split-counterbalance 16 as outlined in Dumbaugh U.S. Pat. No. 4,149,627, which is also incorporated herein by reference. The vibratory conveying apparatus 10 includes a first pair of vibratory motors 12 and a second pair of vibratory motors 14 placed relatively close together on the front section 15 of the counterbalance 16. The rear or back section 18 of the counterbalance 16 has a third pair of vibratory motors 19. In other words, a total of six vibratory motors are utilized as shown in FIG. 6. The two motors in each pair of motors are located transversely across from one another with respect to the longitudinal length of the conveying apparatus 10. Each vibratory motor includes a rotatable eccentric weight 20. Since the rotating eccentric weights 20 are located on the top and bottom of each motor, a total of twelve individual eccentric weights would be involved, but all of the eccentric weights on a single motor are considered herein to be a single eccentric weight. The eccentric weight 20 attached to one of the vibratory motors 11 in a pair of vibratory motors is substantially equal in size to the eccentric weight attached to the other vibratory motor 11 in the pair of vibratory motors. Each motor is rated 5 HP, which would make a total of 30 HP provided by the six vibratory motors, although other sizes of motors can be used. If desired, only two pairs or more than three pairs of vibratory motors and eccentric weights can be used. While electric motors are preferred, air motors or hydraulic motors can also be used.

Each vibratory motor 11 in a pair of vibratory motors preferably has the substantially same size eccentric weight 20 attached thereto, such that each vibratory motor and eccentric weight in the pair of vibratory motors and eccentric weights produce substantially the same force output during operation. However, the total force output of a first pair of vibratory motors and eccentric weights does not necessarily have to equal the total force output of a second pair of vibratory motors and eccentric weights.

All six motors synchronize and provide an accumulatively phased force output equal to the sum of the individual force outputs of all three pairs of eccentric weights 20. The proper phasing of the pairs of eccentric weights 20 happens if each pair of motors 12, 14 or 19 is started separately, or in any combination, or all started at the same time. The two motors 11 in each pair of motors 12, 14 and 19 rotate in the opposite direction relative to one another, which is preferred for a unidirectional conveying apparatus. However, these motors would still try to "phase" even if the rotation was different when these six motors are working in conjunction with sub-resonant tuned steel coil drive springs that have flat bar type stabilizers to guide their stroke line.

The conveying apparatus 10 includes a top bed such as a trough assembly 26 for conveying the conveyed material, which may, for example, be a fluidized bed for passing air up through the conveyed material, such as foundry sand. Underneath the top trough assembly 26 are a plurality of brackets 28 containing steel helical coil type drive springs 22 as shown in FIG. 6. These are very stiff springs that are singularly bolted at the top and bottom end to the mounting brackets 28. The sectionalized, longitudinal type counterbalance 16 is positioned under the sets of sub-resonant tuned drive springs 22. The split or separation in the counterbalance 16 is bolted together, as shown in FIG. 7, by flat bar type straps 30 at the top and bottom flanges of each beam that makes up the counterbalance. On the vertical webs of the counterbalance, two rubber bushed steel shank connecting arm links 32 are utilized as shown in FIG. 7. This connection is relatively strong in tension and compression in the horizontal plane. Vertically, it is relatively resilient or not very strong. Supporting the entire vibratory conveying apparatus 10 are steel coil type isolation springs 34 mounted vertically in compression. Two pairs of vibratory motors 12 and 14 are mounted close together on the front or the longer section 15 of the counterbalance 16. The motors in the third pair of motors 19 are mounted directly across from one another on the rear or the shorter portion 18 of the counterbalance 16. The goal is to make the load carrying trough 26 to vibrate at a prescribed stroke of, for example, one-half inch at a frequency of 570 cycles per minute (CPM), which is the same as the rotational speed of the motors at 570 revolutions per minute (RPM). In other words, the operating frequency of the conveying apparatus 10 in CPM is the same as the RPM of the motors.

The motors can be energized in separate steps of individual pairs. Preferably, the first pair of motors 12 at the front, and then the second pair of motors 14 in the middle, and then the third pair of motors 19 installed at the rear. The other option is to energize all six motors at the same time.

After being energized, the motors accelerate the rotatable eccentric weights 20 installed on the top and bottom shaft extension of the motors. While the weights are accelerating, a slight "shimmy" or shudder-like movement may be present in the apparatus 10 in its entirety. After all six motors have reached full speed, the stroke on the conveying trough assembly 26 begins to grow steadily from, for example, from one-eighth inch to the desired maximum of one-half inch in about twenty seconds. Thus, the three pairs of motor combinations require about ten to twenty seconds after being energized to accelerate the eccentric weights 20 and to properly "phase" or to accumulatively synchronize the outputs of the eccentric weights 20.

All of the rotating eccentric weights 20 may have exactly the same force output. If any pair of these motors is de-energized, then the resulting stroke on the trough 26 will decrease by one-third from its maximum amount. If two pairs of motors are de-energized, and only one pair remains energized, then the stroke on the conveying trough 26 will be reduced to one-third its maximum amount.

The "phased" or synchronized eccentric weights 20 on the vibratory motors excite or prompt the steel coil drive springs 22 to move back and forth, or compress and extend, in a straight line of stroke. That "line" is guided by the flat bar type stabilizers 24 installed 90° or perpendicular to the axial centerline of the steel coil drive springs 22. The conveying trough 26 positioned on top of the drive spring brackets 28 vibrates back and forth in reaction to the movement of the counterbalance 16 below. This is in keeping with Newton's Law of an "equal and opposite reaction". Stabilization of the drive springs 22 must be relatively rigid in a direction transverse to the line of stroke and relatively weak in the direction of stroke. For example, the flat bar stabilizer 24 may be five inches wide across its transverse width and only one-eighth inch thick in the direction of the stroke. If the drive springs 22 are not rigidly stabilized in a direction transverse to the line of stroke, then the rotating eccentric weights may not synchronize. The stabilizers 24 may be formed in other configurations than as flat bars so long as the stabilizer is relatively rigid in a direction transverse to the line of stroke and relatively weak in the direction of stroke. The vibratory motors are tilted or inclined from horizontal to agree with the stroke line and the installed inclined angle of the drive springs 22.

The entire apparatus 10 vibrates very smoothly and quietly when all six motors are up to their full speed. The amount of vibratory stroke remains constant or steady. A given amount of bulk solid, such as foundry sand, in the conveying trough 26 installed above the counterbalance 16 can be conveyed forward at a steady speed of, for example, approximately forty feet per minute (FPM).

The stiff steel coil drive springs 22 have a combined natural frequency that is always above the maximum speed of the motors being utilized. "Sub" means "under" and "resonant" means "natural frequency". Therefore, "sub-resonant" means to maintain the top running speed of the motor (for example, 600 RPM or CPM) to always be under the "natural frequency" of all the steel coil drive springs 22 (for example, 650 CPM) when the vibratory conveyor 10 is in the "no load" state or empty condition. When a load is applied to the conveying trough 26, the "natural frequency" of all the installed drive springs 22 will inherently reduce in response to the added weight of the load (for example, to 625 CPM). Because the natural frequency of the drive springs 22 has decreased (from 650 to 625 CPM), and moved closer to the motor speed (600 RPM or CPM), the entire drive configuration works harder. The more the natural frequency of the drive springs 22 decreases because of additional load being added to the conveying trough 26, the more close the natural frequency of all the drive springs 22 comes to the running speed of the motors. Thus, the drive configuration works even harder. This is the advantage of "sub-resonant" tuning.

Consequently, the stiff steel coil drive springs 22 in combination with the six motors inherently drive harder when load is applied to the conveying trough 26. Therefore, the use of "sub-resonant" tuning takes advantage of the principal of "natural frequency". However, it should be noted this kind of drive configuration does not normally operate in "natural frequency".

When the conveying apparatus is of relatively light-weight construction, the steel coil type of drive springs could be omitted and only the stabilizers can be used as drive springs to achieve the desired sub-resonant tuning. An example is a very light-weight food handling conveyor of a sanitary design.

"Phasing" of the eccentric weights 20 is more efficiently and effectively accomplished when the first pair of motors 12 nearest to the discharge end of the induced conveying apparatus 10 have a higher eccentric force output than do the remaining motors. For example, if a total of 35,000 pounds (lbs) of force were required in this example, the most downstream paired group of eccentric weights 20 should have a combined output of, for example, 20,000 pounds. Then the rotating eccentric weights spaced along the upstream length of the conveying trough or the remaining upstream portion of the counter-balance would have a total force output of 15,000 pounds.

Further, the stiff drive springs 22 should be arranged so the half-length of the trough 26 nearest to the discharge end of the vibratory apparatus 10 would have a higher percentage of the required number of drive springs 22 installed. The remaining or upstream half of the trough length will have less than half the total required number of drive springs 22 installed. When the counter-balance is "sectionalized", then the orientation and installation of the required number of drive springs 22 will have the same relationship on each section of the counterbalance. Namely, more than half of the total needed drive springs 22 are installed on the downstream half of the section's length. Said differently, more drive springs 22 are installed on the half-length of an individual counterbalance section that is nearest to the discharge end of the vibratory apparatus 10. The other half of the counter-balance section that is upstream would have less than half of the required number of drive springs 22 installed. In other words, the half-length of the counter-balance section that was nearest to the inlet or more distant from the discharge end would have a lesser number of drive springs 22 installed. However, the flat bar type stabilizers 24 remain evenly distributed across the width and along the length of the vibratory apparatus 10.

The objective is to make the respective force outputs of the eccentric weights 20 to "pull" the trough 26 of the conveying apparatus 10 in tension from the discharge end as compared to "pushing" the inertial mass in compression from the inlet end. The same relationship is wanted from the total number of drive springs 22 installed that help to make the apparatus 10 vibrate. This is the reason the collective forces from both the rotating eccentric weights 20 and the drive springs 22 should place the overall length of the vibratory apparatus 10 in tension as compared to being in compression. More simply stated, the vibratory apparatus is dynamically being "pulled" instead of being "pushed".

Until now, the single pair of vibratory motors was placed in the mid-section of the length of the conveying apparatus, and the steel coil drive springs 22 were equally distributed along the length of the vibratory apparatus. No intentional effort was made to place more force output on the downstream half when compared to the upstream half of the length of the vibratory apparatus.

The rotation of the two motors in each pair of motors 12, 14 and 19 are preferred to be opposite to one another, but with all the motors on each side of the apparatus 10 otherwise all rotating in the same direction. The vibratory apparatus 10 will still have proper "phasing" when all the vibratory motors are not turning opposite to one another and with the same direction. However, indications are the performance of the vibratory apparatus 10 will most likely be less than the achievable results when all the pairs of eccentric weights are turning opposite to one another as shown in FIGS. 8A–D.

Electrically, each set of paired motors 12, 14 and 19 can be started separately until all are energized. Preferably, from the front to the back. The other option is to start all the paired motors at the same time, but this causes the electrical power supply to be subjected to the maximum amount of in-rush current by totaling all the combined motors.

When an electrical means for adjusting the operating stroke and frequency of the vibratory machine is wanted, such as shown in FIG. 10, it is preferred to be large enough to control the total combination of paired motors installed on the vibratory apparatus 10. If each of the paired motors is to be controlled individually for some reason, then the appropriate steps must be taken to ensure each of those individual controllers are responding to the same electrical pilot signal (usually 4 to 20 ma d.c.) to ensure each of the motors is rotating at the same speed throughout the range of adjustment. This may be accomplished by use of a common electrical potentiometer on either the variable voltage or the frequency inverter type of electrical controls. This applies to both the unidirectional and the circular conveying kind of induced conveying vibratory machines.

The respective overload protection for each of the paired motors can shut down that given pair when electrical difficulty is experienced. This overload protection does not have to shut down all the other paired motors when an electrical overload is experienced with a given pair of motors. This also permits the vibratory apparatus 10 to remain in operation even though its tons per hour (TPH) capacity will probably be at a reduced amount. This permits production to be maintained and the vibratory machine can be scheduled for a more timely "shutdown" to repair the electrical problem.

A non-counterbalanced vibratory conveying apparatus is shown in FIG. 11 including a plurality of pairs of vibratory motors 12, 14 and 19 each having rotatable eccentric weights attached to the trough 26. A plurality of inclined drive springs 22 and stabilizers 24 support the trough 26 on a stationary base.

A counterbalanced vibratory conveying apparatus is shown in FIG. 12 having a one-piece counterbalance 16 and a plurality of pairs of vibratory motors 12 and 14 each having rotatable eccentric weights.

A vibratory conveying apparatus is shown in FIG. 13 that includes a three-piece sectionalized counterbalance 16 and three pairs of vibratory motors 12, 14 and 19 each including rotatable eccentric weights, wherein each pair of vibratory motors is attached to a respective section of the counterbalance.

A circular vibratory conveying apparatus is shown as a spiral elevator in FIGS. 14A and 14B which includes a plurality of pairs of vibratory motors 12 and 14 each having rotatable eccentric weights 20. The accumulative phasing of the eccentric weights of the circular conveyor of FIGS. 14A–B is shown in FIGS. 15A–D. If desired, only three individual or equal groups of vibratory motors may be used that are spaced approximately one hundred twenty degrees apart.

A plurality of paired vibratory motors with respective rotating eccentric weights can be appropriately spaced along the length or around the diameter of a vibratory apparatus and both their total dynamic force output and the horsepower capability will be accumulatively available to help drive the apparatus. The unidirectional or circular induced conveying apparatus can be non-balanced and fixed to the earth, or dynamically counterbalanced with isolator springs 34 to support it.

In addition to reducing cost, the present invention provides many benefits. The vibratory motors can be utilized on sectionalized, longitudinally counterbalanced conveying apparatus. This permits the building of longer length conveying apparatus with more TPH capacity. The number of component parts is minimized which aids in manufacturing. Finally, the simultaneous adjustment of the operating stroke and frequency by means of a variable voltage electrical control as outlined in U.S. Pat. Nos. 3,251,457 and 4,015,705 can be successfully utilized. As a substitute for the variable voltage control, a frequency inverter can also be utilized.

Since these motors are combined with sub-resonant tuned drive springs 22 that are properly stabilized by stabilizers 24, the combination of a plurality of pairs of motors requires less work output per pair of motors to align with the movement of the stiff drive springs 22 than it would be to try to be "out of step" or not phased or accumulatively synchronized with all the sub-resonant tuned drive springs 22.

The paired dynamic force outputs of the free-wheeling non-mechanically linked eccentric weights 20 can be spread out or distributed along the length of the conveying apparatus. This reduces the structural stresses when the apparatus is vibrating. The reason is a number of smaller dynamic forces are utilized instead of one much larger force. Further, those smaller forces are spread out and not concentrated at a single location. The same happens with circular conveying apparatus. The forces are distributed around the circumference of the apparatus.

When using vibratory motors in the present invention, a number of smaller motors can be utilized instead of two motors of a much larger size. The smaller motors are easier to handle and readily available. This also avoids the development costs of much bigger motors of the same total power capability. The dimensional requirements of the eccentric weights and the respective motor, vee-belts, chains, bearings, and the like, are minimized. Otherwise, all those components would have to be much larger. The motors can be started in paired increments or steps. This minimizes the "inrush current" demand on the electrical power supply. The "inrush current" would be much higher at the starting of two big motors of the same capability.

Since the conveying capacity of any vibratory apparatus is directly related to how much power is available, the present invention enables much higher tons per hour (TPH) of material to be conveyed or transported. The ability to design and build wide and long vibratory apparatus has been well known for many years. However, being able to provide the needed amount of input power has been an engineering challenge. With this invention, that problem is solved. The required amount of motor horsepower can now be provided with a plurality of paired motors each having respective rotatable eccentric weights that accumulatively phase or "add up" to equal the total amount of horsepower needed.

While the drive springs are shown as being inclined, the drive springs could be positioned horizontal or vertical and the same accumulating benefits would be realized.

FIGS. 16A–D illustrate a circular vibratory conveying apparatus 50 including three vibratory motors 52A–C. Each vibratory motor 52A–C includes a rotatable eccentric weight 54 that is adapted to be rotated about a rotational axis 56. The vibratory motors 52A–C and their eccentric weights 54 are generally symmetrically located about the central axis 58 of the circular vibratory conveying apparatus 50. The vibratory motors 52A–C and the eccentric weights 54 are located generally equidistantly from the central axis 58 and are spaced approximately one-hundred twenty degrees apart from one another about the central axis 58. The central axis 58 is typically generally vertical. Each vibratory motor 52A–C is located on a respective radial line 60 that extends generally linearly and radially outwardly from and perpendicular to the central axis 58. The rotational axis 56 of each eccentric weight 54 is inclined with respect to horizontal and is generally tangential to a radial line 60. As used herein tangential means generally perpendicular. The respective rotational axes 56 of the eccentric weights 54 are all located at approximately the same angle of inclination with respect to horizontal. Each of the eccentric weights 54 of the vibratory motors 52A–C are adapted to rotate in generally the same rotational direction with respect to one another. As shown in FIGS. 16A–D, all of the eccentric weights 54 rotate generally counter-clockwise about their rotational axes 56.

The circular vibratory conveying apparatus 50 may be used to convey material in a generally circular manner, either along a horizontal curve or along an inclined curve in a generally helical manner depending on the configuration of the bed 66 of the conveying apparatus 50. Conveyance in a circular manner includes conveyance in less than a full three-hundred sixty degrees, as well as in a helical manner.

The circular vibratory conveying apparatus 50 has a tangential line of stroke at each point along each radial line 60 extending perpendicular from the central axis 58 to the outer peripheral end of the conveying apparatus 50. The tangential lines of stroke are generally linear and generally perpendicular to the radial line 60. The stroke angle of the tangential lines of stroke, with respect to horizontal, decreases outwardly along the radial line 60, from a generally vertical or ninety-degree stroke angle at the central axis 58, that is generally parallel to the central axis 58, to an outer peripheral stroke angle at the outer peripheral end of the bed 66 of the conveying apparatus 50 that may be, for example, forty-five degrees. A typical outer stroke angle of the tangential line of stroke at the outer peripheral end of the bed of the conveying apparatus 50 is approximately forty-five degrees, although other outer peripheral angles of stroke can be used if desired. If the tangential stroke angle is approximately forty-five degrees at the outer peripheral end of the bed 66 of the conveying apparatus 50, the tangential stroke angle will generally increase from forty-five degrees with respect to horizontal at the outer peripheral end of the bed to approximately ninety degrees or vertical at the central axis 58. Vibration of the bed 66 along the tangential lines of stroke results in the bed 66 providing a generally helical output stroke for conveying material. As the bed 66 vibrates along the tangential lines of stroke, the bed 66 has a twist type of stroke that is generally horizontal and circular about the central axis 58, and a generally vertical or lift type of stroke that is generally parallel to the central axis 58. The combined twist and lift strokes result in a generally helical stroke.

Each rotatable eccentric weight 54 is free-wheeling with respect to the other eccentric weights 54 for independent rotation about its rotational axis 56. The rotatable eccentric weights 54 are not mechanically, electrically or otherwise physically rotationally linked or coupled to one another, such that the rotational position of one eccentric weight 54 is not selectively controlled or positioned with respect to any other eccentric weight 54, whereby the eccentric weights 54 are free-wheeling with respect to one another. The vibratory motors 52A–C may be electrically connected to one another such that the rotational speeds of the eccentric weights 54 about their rotational axes 56 can be uniformly and simultaneously increased or decreased, while the weights 54 remain free-wheeling with respect to one another. The rotational axis 56 of each eccentric weight 54 is located generally perpendicular to a respective tangential line of stroke at the location of the eccentric weight 54. The rotational positions of the eccentric weights 54 of the vibratory motors 52A–C inherently synchronize with one another as shown in FIGS. 16A–D to vibrate the bed 66 of the conveying apparatus 50 along a generally helical output stroke. The circular vibratory conveying apparatus 50 may include additional vibratory motors and eccentric weights if desired.

As shown in FIG. 17, the bed 66 of the conveying apparatus 50 includes a trough 68 for conveying material. The trough 68 has a width 70 which extends generally radially from a generally circular or helical inner end 72 to a generally circular or helical peripheral outer end 74. The bed 66 and trough 68 include the central axis 58 and include an inlet 76 and an outlet 78.

The circular vibratory conveying apparatus 50 includes a plurality of resilient inclined peripheral drive springs 84. The peripheral drive springs 84 are located in an array generally symmetrically about the central axis 58 and along a plurality of radial lines 60. The peripheral drive springs 84 are generally located between the inner end 72 and outer end 74 of the trough 68. As shown in FIG. 22 each peripheral drive spring 84 includes a first end 86, a second end 88 and a generally linear central axis 90. Each end 86 and 88 of a peripheral drive spring 84 includes a connector member 92 such as a pigtail type of eye. The connector member 92 at the first end 86 of the spring 84 is connected to an upper bracket 94 of the bed 66 by a threaded fastener 96, such as a threaded bolt and a threaded nut, and a washer 98. The connector member 92 at the second end 88 of the drive spring 84 is similarly connected to a lower bracket 100 by a threaded fastener 96 and washer 98. The lower bracket 100 is adapted to be connected to a circular counterweight or a stationary member. Each peripheral drive spring 84 may be a metal helical coil spring.

The central axis 90 of each peripheral drive spring 84 is inclined at an angle 102 to the horizontal which is equal to the angle of the tangential line of stroke of the conveying apparatus 50 at the position where the drive spring 84 is located along the radial line 60. The central axis 90 of each peripheral drive spring 84 is generally perpendicular to the radial line 60 on which the drive spring 84 is located. Each peripheral drive spring 84 is adapted to resiliently compress and extend along its central axis 90 and thereby along the tangential line of stroke. As shown in FIG. 23, two drive springs 84 may be attached to one upper bracket 94 and to one lower bracket 100, generally parallel to one another, to provide an increase in spring force.

The circular vibratory conveying apparatus 50 also includes a plurality of resiliently flexible inclined outer stabilizers located adjacent the outer end 74 of the trough 68. The conveying apparatus 50 may also include a plurality of resiliently flexible inclined inner stabilizers 112. The inner stabilizers 112 are located generally adjacent to the inner end 72 of the trough 68. The stabilizers 110 and 112 are generally symmetrically located about the central axis 58. Each stabilizer 110 and 112 is located on a radial line 60.

As shown in FIGS. 24 and 25, each outer stabilizer 110 includes a first end 114, a second end 116 and a generally linear longitudinal central axis 118. The first end 114 is adapted to be attached by fasteners 124 to an upper bracket 120 of the bed 66 of the conveying apparatus 50. The second end 116 is adapted to be attached to a lower bracket 122 by fasteners 124. The lower bracket 122 may be attached to a circular counterweight or to a stationary member. Each stabilizer 110 may include one or more resiliently flexible generally plate-like bar members 126. The central axis 118 of each outer stabilizer 110 is located generally perpendicular to a radial line 60 extending from the central axis 58, and its width is located generally perpendicular to the tangential line of stroke at the location of the stabilizer on the radial line 60. Each bar member 126 can be formed from a material such as fiberglass or metal. Each stabilizer 110 is adapted to be more rigid in a direction transverse to the tangential line of stroke than the stabilizer is rigid in the direction of the tangential line of stroke, such that the stabilizer 110 is resiliently flexible in the tangential line of stroke. The inner stabilizers 112 are constructed in the same manner, and operate in the same manner, as the outer stabilizers 110.

Another embodiment of a circular vibratory conveying apparatus is shown in FIG. 18 with the reference number 130. The conveying apparatus 130 includes many of the same elements as the circular vibratory conveying apparatus 50 of FIG. 17 and similar elements are numbered with the same reference numbers. The conveying apparatus 130 includes a plurality of inclined peripheral drive springs 84 and outer stabilizers 110 that are symmetrically located about the central axis 58 of the conveying apparatus 130. The conveying apparatus 130 also includes a plurality of vibratory motors and eccentric weights coupled to the bed 68 of the conveying apparatus 130. If desired, three or four vibratory motors and eccentric weights can be symmetrically coupled to the bed 68.

As shown in FIG. 17, the relatively large center portion of the bed 66 of the conveying apparatus 50, that is generally located within the inner end 72 of the trough 68, is not normally directly supported by any drive springs. However, when this center portion is relatively small, for example three feet in diameter or less, no inclined drive springs are located in this area of the conveying apparatus 50 as this central area was previously considered too difficult to reach for maintenance purposes, such as if the fasteners 96 that connect the inclined drive springs 84 to the brackets 94 and 100 require tightening should they become loose due to vibration. For example, the overall height of the required number of turns of an inclined bed 66 has been increasing in order to meet industry requirements for the ability to convey material to higher elevations as illustrated in FIG. 14A. As the height of the bed 66 increases the weight of the bed 66 also increases and more drive springs are needed to vibrate the bed 66. When the height of the bed 66 is, for example, more than twice its outside diameter, it is difficult to find sufficient space on the bed 66 to install the required number of inclined peripheral drive springs 84 that are needed to vibrate the bed 66.

The circular vibratory conveying apparatus 130 as shown in FIG. 18 includes one or more generally vertical central drive springs 132 that are generally symmetrically located about the central axis 58. The central drive springs 132 are generally located within the inner end 72 of the trough 68 and centrally within the array of peripheral inclined drive springs 84. As shown in FIG. 19, each central drive spring 132 includes a first end 134, a second end 136 and a generally linear central axis 138. The central axis 138 of each central drive spring 132 is generally vertical and parallel to the central axis 58 of the bed 66. Each central drive spring 132 includes a generally hollow cylindrical bore 140 that extends from the first end 134 to the second end 136 along the central axis 138. Each end 134 and 136 of the central drive spring 132 is squared and ground such that each end can matingly engage a generally planar surface. As shown in FIG. 19, the first end 134 of the central drive spring 132 is adapted to matingly engage a generally planar and horizontal surface of an upper bracket 142 of the bed 66 of the conveying apparatus 130. The second end 136 of the central drive spring 132 is adapted to matingly engage a generally planar and horizontal surface of a lower bracket 144 that is adapted to be connected to a circular counterbalance or a stationary member. Each central drive spring 132 is adapted to resiliently compress and extend along its central axis 138. Each central drive spring 132 may comprise a generally helical metal coil spring.

As shown in FIG. 19, a first mounting member 148 is adapted to removably couple the first end 134 of the central drive spring 132 to the upper bracket 142. A second mounting member 150 is adapted to removably couple the second end 136 of the central drive spring 132 to the lower bracket 144. The mounting members 148 and 150 respectively prevent movement of the ends 134 and 136 of the central drive spring 132 in a direction transverse to the central axis 138 with respect to the brackets 142 and 144.

As shown in FIGS. 20 and 21 the first mounting member 148 includes a generally cylindrical peripheral side wall 152 that extends from a first end 154 to a second end 156. The side wall 152 includes a generally cylindrical outer surface 158 that extends from the first end 154 to the second end 156, and a generally cylindrical inner surface 160 that extends from the first end 154 to the second end 156. The second mounting member 150 is constructed in the same manner as the first mounting member 148. The mounting members 148 and 150 may comprise generally cylindrical rings.

The first end 154 of the first mounting member 148 is adapted to be attached to the horizontal planar surface of the upper bracket 142. The second end 156 of the first mounting member 148 is adapted to be removably inserted into the bore 140 at the first end 134 of the central drive spring 132 such that the outer surface 158 of the side wall 152 is located closely adjacent to the drive spring 132. The first mounting member 148 thereby prevents movement of the first end 134 of the drive spring 132 transversely to the central axis 138 of the drive spring 132. The second mounting member 150 is similarly attached to the horizontal planar surface of the lower bracket 144 and is removably inserted into the bore 140 at the second end 136 of the drive spring 132. The second mounting member 150 prevents transverse movement of the second end 136 of the drive spring 132.

Alternately, the diameter of the inner surfaces 160 of the mounting members 148 and 150 may be sufficiently large such that the ends 134 and 136 of the drive spring 132 are received within the mounting members 148 and 150. In this embodiment the side walls 152 of the mounting members 148 and 150 are located closely around the outer perimeter of the central drive spring 132, such that the ends of the drive spring 132 are located within the side walls 152, and such that the side walls 152 prevent transverse movement of the ends 134 and 136.

Each central drive spring 132 is precompressed a selected distance when it is located between the upper and lower brackets 132 and 144. The precompression distance may be a distance that is at least one-half of the stroke that is anticipated at the location of the central drive spring 132. For example, if the anticipated maximum length of stroke at a drive spring location is approximately three-quarters of an inch, the minimum compression distance would be approximately three-eighths of an inch, such that a pre-compression of approximately one-half inch may be used to insure sufficient precompression. Precompression of the central drive springs 132 ensures the central drive springs are always in compression and will remain in contact with the bed 66 during vibration of the bed 66.

No access is required to the central drive springs 132 to tighten any fasteners. If a central drive spring 132 should fail, the bed 66 can be lifted by jacks or the like, any peripheral drive springs may be removed as necessary to obtain access to the failed central drive spring, and the central drive spring 32 can be removed and replaced from the mounting members 148 and 150 without the need to remove or replace any fasteners.

The central drive springs 132 may provide at least approximately thirty percent of the total spring force that is needed to be provided to the bed 66 for vibratory operation. When central drive springs 132 are used, the total number of peripheral drive springs 84 can be reduced as the peripheral drive springs 84 only need to provide approximately seventy percent of the total required spring rate to vibrate the bed of the conveying apparatus 130. The central drive springs 132 preferably have a relatively large spring rate (pounds per inch) and are preferably designed to have a very long service life. The use of central drive springs 132 enables the use of taller and heavier beds 66 for conveying material.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A circular vibratory conveying apparatus adapted to vibrate and to convey material, said circular vibratory conveying apparatus including:
   a bed on which the material is adapted to be conveyed in a generally circular direction with respect to a central axis of said bed;
   a plurality of peripheral drive springs located generally symmetrically about said central axis of said bed, said peripheral drive springs being generally located on a plurality of radial lines extending radially outwardly from said central axis of said bed, each said peripheral drive spring having a first end, a second end and a central axis, said first end of each said peripheral drive spring being operatively attached to said bed, each said peripheral drive spring adapted to compress and extend along a respective tangential line of stroke;
   a plurality of inclined stabilizers located generally symmetrically about said central axis of said bed, each said stabilizer having a first end, a second end and a longitudinal axis, said first end of each said stabilizer being operatively attached to said bed, said longitudinal axis of each said stabilizer being generally perpendicular to a respective tangential line of stroke of said bed at the position of said stabilizer, each said stabilizer being more rigid in a direction transverse to said tangential line of stroke than said stabilizer is rigid in the direction of said tangential line of stroke, said stabilizers allowing movement of each said peripheral drive spring generally parallel to said central axis of said peripheral drive spring and inhibiting movement of each said peripheral drive spring generally transversely to said central axis of said peripheral drive spring;
   a first rotatable eccentric weight coupled to said bed, said first rotatable eccentric weight adapted to rotate about a first axis, a second rotatable eccentric weight coupled to said bed, said second rotatable eccentric weight adapted to rotate about a second axis, and a third rotatable eccentric weight coupled to said bed, said third rotatable eccentric weight adapted to rotate about a third axis, said rotatable eccentric weights being located generally symmetrically about said central axis of said bed, said rotatable eccentric weights being free-wheeling with respect to one another and adapted to rotate at substantially the same operating speed with respect to one another, each said rotatable eccentric weight adapted to provide an output force generally perpendicular to its axis of rotation, said rotatable eccentric weights adapted to accumulatively synchronize with one another such that the combined resulting output force of said rotatable eccentric weights is adapted to provide a generally helical output stroke to said bed;
   whereby rotation of said rotatable eccentric weights, in combination with said stabilizers, accumulatively synchronize such that the output forces of said rotatable eccentric weights and their respective power outputs accumulatively add to cause said bed to vibrate along said generally helical output stroke.

2. The circular vibratory conveying apparatus of claim 1 including a first vibratory motor, said first rotatable eccentric weight being attached to said first vibratory motor, a second vibratory motor, said second eccentric weight being attached to said second vibratory motor, and a third vibratory motor, said third eccentric weight being attached to said third vibratory motor.

3. The circular vibratory conveying apparatus of claim 2 wherein said peripheral drive springs have a natural frequency of vibration and said vibratory drive motors are adapted to rotate said eccentric weights at substantially the same operating speed, said natural frequency of said peripheral drive springs being greater than said operating speed of said vibratory motors.

4. The circular vibratory conveying apparatus of claim 1 wherein said rotatable eccentric weights are rotatably attached to said bed.

5. The circular vibratory conveying apparatus of claim 1 including a circular counterbalance, said second ends of said drive springs and said second ends of said stabilizers being attached to said counterbalance.

6. The circular vibratory conveying apparatus of claim 5 including a plurality of isolation springs attached to said counterbalance and symmetrically located about said central axis of said bed, said isolation springs adapted to support said counterbalance on a support structure.

7. The circular vibratory conveying apparatus of claim 5 wherein said rotatable eccentric weights are rotatably attached to said counterbalance and are thereby coupled to said bed.

8. The circular vibratory conveying apparatus of claim 7 including a first vibratory motor attached to said counterbalance, said first rotatable eccentric weight being attached to said first vibratory motor, a second vibratory motor attached to said counterbalance, said second rotatable eccentric weight being attached to said second vibratory motor, and a third vibratory motor attached to said counterbalance, said third rotatable eccentric weight being attached to said third vibratory motor.

9. The circular vibratory conveying apparatus of claim 1 including a fourth rotatable eccentric weight coupled to said bed, said rotatable eccentric weights being generally symmetrically located about said central axis of said bed with respect to one another.

10. The circular vibratory conveying apparatus of claim 1 wherein each said peripheral drive spring is sub-resonant tuned.

11. The circular vibratory conveying apparatus of claim 1 including one or more central drive springs located inwardly with respect to said peripheral drive springs, each said central drive spring having a first end, a second end and a central axis, said first end of each said central drive spring being in operative engagement with said bed, said central axis of each said central drive spring being located generally parallel to said central axis of said bed, each said central drive spring adapted to compress and extend along said central axis of said central drive spring.

12. The circular vibratory conveying apparatus of claim 11 including a first mounting member attached to said bed and adapted to couple said first end of said central drive spring to said bed, said mounting member inhibiting movement of said central drive spring in a direction transverse to said central axis of said central drive spring.

13. The circular vibratory conveying apparatus of claim 11 wherein each said central drive spring is precompressed.

14. A method of vibrating a conveying apparatus to convey material in a generally circular direction, said method including the steps of:
providing a bed on which material is adapted to be conveyed in a generally circular direction about a central axis of said bed;
providing a plurality of peripheral drive springs located generally symmetrically about said central axis of said bed and located on a plurality of radial lines extending radially outwardly from said central axis of said bed, each said drive spring having a first end attached to said bed and a second end attached to a support, each said drive spring adapted to compress and extend along a respective tangential line of stroke that is generally perpendicular to a radial line;
providing a plurality of stabilizers attached to said bed and located generally symmetrically about said central axis of said bed, each said stabilizer being more rigid in a direction transverse to a tangential line of stroke of said bed than said stabilizer is rigid in the direction of said tangential line of stroke;
providing a first vibratory motor having a first rotatable eccentric weight adapted to rotate about a first axis, a second vibratory motor having a second rotatable eccentric weight adapted to rotate about a second axis, and a third vibratory motor having a third rotatable eccentric weight adapted to rotate about a third axis, said vibratory motors being located generally symmetrically about said central axis of said bed, said eccentric weights being free-wheeling with respect to one another, each said vibratory motor adapted to operate at substantially the same operating speed and to provide an output force generally perpendicular to its axis of rotation, said rotatable eccentric weights adapted to accumulatively synchronize with one another without being rotationally coupled to one another such that the combined resulting output force of said rotatable eccentric weights is adapted to provide a generally helical output stroke to said bed;
operating said vibratory motors to rotate said eccentric weights, such that said rotating eccentric weights accumulatively synchronize and accumulatively add their output forces and their respective power outputs and thereby vibrate said bed along said generally helical output stroke at a vibration frequency; and
operating each said vibratory motor at substantially the same selected operating speed which approaches being equal to, but is less than, the natural frequency of said drive springs.

15. The method of claim 14 including the step of uniformly adjusting the vibration frequency of said bed by electrically and simultaneously adjusting the rotational speed of each of said vibratory motors, while said vibratory motors continue to operate at substantially the same rotational speed with respect to one another.

16. The method of claim 14 including the step of adjusting the operating stroke and frequency of said drive springs and stabilizers by use of an electrical control connected to each said vibratory motor for simultaneously changing the rotational speed of said vibratory motors, while said vibratory motors continue to operate at substantially the same rotational speed with respect to one another.

17. The method of claim 14 wherein said rotatable eccentric weights are rotated in the same direction relative to one another.

18. A circular vibratory conveying apparatus adapted to vibrate and to convey material, said circular vibratory conveying apparatus including:
a bed on which the material is adapted to be conveyed in a generally circular direction with respect to a central axis of said bed;
a plurality of peripheral drive springs located generally symmetrically about said central axis of said bed, each said peripheral drive spring having a first end, a second end and a central axis, said first end of each said peripheral drive spring adapted to be operatively attached to said bed, each said peripheral drive spring adapted to compress and extend along said central axis of said peripheral drive spring, said central axes of said peripheral drive springs being inclined with respect to horizontal;
one or more central drive springs located generally centrally within said peripheral drive springs, each said central drive spring having a first end, a second end and a central axis, said first end of each said central drive spring adapted to operatively support said bed, said central axis of each said central drive spring being generally parallel to said central axis of said bed; and
a plurality of rotatable eccentric weights coupled to said bed;
whereby rotation of said eccentric weights causes said bed to vibrate such that said peripheral drive springs and said central drive springs compress and extend as said bed vibrates.

19. The circular vibratory conveyor apparatus of claim 18 including a plurality of central drive springs located adjacent and about said central axis of said bed.

20. The circular vibratory conveyor apparatus of claim 19 wherein said bed includes a first mounting member adapted to removably couple said first end of said central drive spring to said bed.

21. The circular vibratory conveyor apparatus of claim 20 wherein said first mounting member includes a side wall adapted to engage said first end of said central drive spring to prevent movement of said first end of said central drive spring generally transverse to said central axis of said central drive spring.

22. The circular vibratory conveyor apparatus of claim 20 wherein said first mounting member is adapted to be removably inserted into said first end of said central drive spring.

23. The circular vibratory conveyor apparatus of claim 20 wherein said first mounting member comprises a generally cylindrical ring.

24. The circular vibratory conveyor apparatus of claim 20 including a second mounting member for removably coupling said second end of said central drive spring to a support member.

25. The circular vibratory conveyor apparatus of claim 18 wherein each said central drive spring is precompressed.

* * * * *